(12) United States Patent
Hayama et al.

(10) Patent No.: US 6,661,800 B1
(45) Date of Patent: Dec. 9, 2003

(54) COMMUNICATION NETWORK SYSTEM AND LOOPBACK CONTROL METHOD

(75) Inventors: Akira Hayama, Sagamihara (JP); Yoshiro Osaki, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/328,670

(22) Filed: Jun. 9, 1999

(30) Foreign Application Priority Data

Jun. 10, 1998 (JP) ............................................. 10-162177
Jul. 14, 1998 (JP) ............................................. 10-198908

(51) Int. Cl.[7] .............................................. H04L 12/42
(52) U.S. Cl. ........................................ 370/403; 370/249
(58) Field of Search ................................ 370/219–220, 370/222–224, 242–245, 249, 258, 401, 403–405, 452, 453, 457

(56) References Cited

U.S. PATENT DOCUMENTS

| | | | | |
|---|---|---|---|---|
| 5,191,579 A | * | 3/1993 | Matsushita et al. | 370/224 |
| 5,199,025 A | * | 3/1993 | Miwa | 370/224 |
| 5,327,427 A | * | 7/1994 | Sandesara | 370/222 |
| 5,442,623 A | * | 8/1995 | Wu | 370/224 |
| 5,661,720 A | | 8/1997 | Taniguchi | 370/223 |
| 5,815,490 A | * | 9/1998 | Lu | 370/223 |
| 5,956,319 A | * | 9/1999 | Meli | 370/224 |
| 5,982,747 A | * | 11/1999 | Ramfelt et al. | 370/224 |
| 6,002,683 A | * | 12/1999 | Madonna | 370/353 |
| 6,111,853 A | * | 8/2000 | Goodman | 370/224 |
| 6,122,250 A | * | 9/2000 | Taniguchi | 370/222 |
| 6,175,552 B1 | * | 1/2001 | Parry et al. | 370/216 |
| 6,204,943 B1 | * | 3/2001 | Hamel et al. | 359/119 |
| 6,226,111 B1 | * | 5/2001 | Chang et al. | 359/119 |
| 6,272,107 B1 | * | 8/2001 | Rochberger et al. | 370/216 |
| 6,278,690 B1 | * | 8/2001 | Herrmann et al. | 370/224 |
| 6,317,414 B1 | * | 11/2001 | Naohiro | 370/222 |
| 6,392,991 B1 | * | 5/2002 | Yamamoto et al. | 370/222 |
| 6,400,682 B1 | * | 6/2002 | Regula | 370/223 |

* cited by examiner

Primary Examiner—Kwang Bin Yao
Assistant Examiner—Thai Hoang
(74) Attorney, Agent, or Firm—Finnegan, Henderson, Farabow, Garrett & Dunner, L.L.P.

(57) ABSTRACT

A communication network system comprises ring systems (A, B, C, D) and a common node device 20 that is connected in common to ring circuits (5A, 5B, 5C, 5D) of each of the ring systems (A, B, C, D) and that gathers data from each of the ring circuits (5A, 5B, 5C, 5D) relaying it to a relay circuit 30. The common node device 20 accommodates virtual channel paths within all the ring circuits (5A, 5B, 5C, 5D) by means of a virtual path switching path. The relay transmission is realized by means of virtual path switching control that uses this common node device 20 and virtual channel switching control that uses each of the ring nodes within the ring circuits (5A, 5B, 5C, 5D).

18 Claims, 27 Drawing Sheets

GFC:Generic Flow Control

VPI:Virtual Path Identifier

VCI:Virtual Channel Identifier

PT:Payload Type

CLP:Cell Loss Priority

HEC:Header Error Control

COMMUNICATION NETWORK SYSTEM AND LOOPBACK CONTROL METHOD

BACKGROUND OF THE INVENTION

1. Field of the Invention

The present invention is related to a communication network system that comprises either one or a plurality of ring systems, wherein a plurality of node devices and a control node device that controls these node devices are connected by a ring-shaped circuit with communication being carried out between an arbitrary number of node devices or between communication terminals connected to each of the node devices through the ring circuit. In particular, the present invention is related to improvements in the transmission relay portion between each of the ring systems when a plurality of the ring systems are provided and to improvements in a loopback control method that deals with expansion and reduction or fault restoration of node devices without interrupting communication in the ring systems.

2. Description of the Related Art

Communication network systems have been considered in which a plurality of node devices which have an ATM (asynchronous transfer mode) switching function are arranged in a ring shape through the ring circuits such as optical fiber used as a system configuration such as a railroad management system or a roadway management system. And in addition, after connecting local communication terminals such as monitoring cameras or monitoring devices to each of these nodes, data between each of the local communication terminals is transmitted and received through each of the node devices by establishing a plurality of virtual communication paths in a ring shape for the ring circuits and using these communication paths.

FIG. 32 shows the basic configuration of this type of communication network system. This system comprises connecting node devices 10A, 10B, 10C, 10D, 10E and network control device 9 that controls each of these node devices 10A, 10B, 10C, 10D, 10E in a ring shape through the ring circuits that uses, for example, optical fiber.

In a ring system that comprises this type of connection format, node devices 10A, 10B, 10C, 10D, 10E (hereinafter referred to as ring nodes) are actualized using a communication device that has an ATM switching function. Further, network control device 9 (hereinafter referred to as control node) actualized using a communication device that adds an additional function to the ATM switching function that controls the ring nodes 10A, 10B, 10C, 10D, 10E.

Either one or a plurality of local communication terminals can be connected to each ring node 10A, 10B, 10C, 10D, 10E and control node 9. Only local communication terminal 11-1 (connected to ring node 10D) and local communication terminal 11-2 (connected to ring node 10E) are shown in this figure.

Communication between these local communication terminals 11 (11-1, 11-2, —) can be carried out by means of a ring-shaped circuit formed between the ring nodes 10A, 10B, 10C, 10D, 10E and control node 9.

In other words, in this system, a ring is actualized by means of connecting each ring node 10A, 10B, 10C, 10D, 10E and control node 9 using a bi-directional circuit 6. In detail, control node 9 and ring node 10A are connected by a bidirectional circuit comprising circuit 61-1 and circuit 62-6. Further, the gap between ring node 10A and ring node 10B is connected by a bi-directional circuit comprising circuit 61-2 and circuit 62-5. Hereinafter, the gap between ring node 10B and ring node 10C, the gap between ring node 10C and ring node 10D, the gap between ring node 10D and ring node 10E and the gap between ring node 10E and control node 9 are also the same.

Because of this, this system comprises a ring with a direction defined as clockwise comprising circuits 61-1, 61-2, 61-3, 61-4, 61-5, 61-6 and a ring with a direction defined as counterclockwise comprising circuits 62-1, 62-2, 62-3, 62-4, 62-5, 62-6.

In a ring system with this configuration, communication between these local communication terminals 11 is achieved through bi-directional communication that uses a clockwise circuit in an ordinary state. The counterclockwise circuit is operated in a mode reserved for use in a loopback for a circuit fault.

In recent years demands have been increasing to construct network systems which cover a wider range utilizing the ring system shown in FIG. 32. A conventional communication network system that meets these demands has the type of configuration shown in FIG. 33.

This FIG. 33 shows an example of the configuration of a network system comprising three ring networks A, B, C which for the basis of the ring system shown in FIG. 32. In this figure, ring system A comprises six ring nodes 10A-1, 10A-2, 10A-3, 10A-4, 10A-5, 10A-6. From among these ring nodes, 10A-6 gathers the data of the ring system A and is used as a line-gathering/relaying node that relays signals to an external circuit 14.

In like manner, ring system B comprises six ring nodes 10B-1, 10B-2, 10B-3, 10B-4, 10B-5, 10B-6 and ring system C comprises six ring nodes 10C-1, 10C-2, 10C-3, 10C-4, 10C-5, 10C-6. From among these ring nodes, 10B-6 gathers the data of ring system B and ring system C and is used as a line-gathering/relaying node that relays signals to an external circuit 14.

Furthermore, a relay switch 15 is connected to external circuit 14 for the purpose of relaying data from ring nodes 10A-6, 10B-6, 10C-6 of the line-gathering/relaying node to an exchange 40 through relay circuit 30.

As understood from the configuration shown in FIG. 33, in this conventional network system, one ring node (10A-6, 10B-6, 10C-6) from among each of the ring systems A, B, C was used for line-gathering and in addition, it was necessary to provide relay switch 15 to further gather the data.

According to this configuration, in addition to increasing the number of line-gathering nodes in response to the number of ring systems, each line-gathering node had to be arranged at a position where a relay is carried out which worsened the efficiency of the node utilization.

Furthermore, a case was also considered from the viewpoint of improved communication reliability for relay system that is doubled in the line-gathering/relaying of the data of a ring system. For this case however, specialized devices were necessary to control these doubled relay systems.

It has also been considered to use a ring system having the type of configuration shown in FIG. 32 in a railroad management system or a roadway management system. Because of this, particularly strong emphasis has been placed on communication reliability.

From the viewpoint of this type of improved communication reliability, when a fault occurs in this type of system, a loopback control function is normally provided that helps with communication by looping back the communication path using two ring nodes adjacent to the location where the fault occurred forming a communication path that bypasses the location where the fault occurred.

Moreover, this loopback control function is also utilized when expanding or reducing ring nodes.

FIG. 34 to FIG. 36 shows changes in of the loopback control when expanding the ring nodes in a conventional ring system. Further, the ring system of FIG. 34 to FIG. 36 may be considered to use camera 11A as local communication terminal 111 and to use monitor device 11B as local communication terminal 11-2 in the ring system shown in FIG. 32.

Normally, in this system, camera 11A (connected to ring node 10D) and monitor device 11B (connected to ring node 10E) communicate through clockwise communication path 61 set within transmission path 6. At this time, communication path 61 and counterclockwise communication path 62 are in reserve to control the loopback.

When an attempt is made to expand ring node 10F between, for example, ring node 10A and ring node 10B during communication between camera 11A and monitor device 11B, at first, a loopback instruction A is sent from control node 9 to ring node 10A as shown in FIG. 34. By means of receiving this loopback instruction A, ring node 10A implements a loopback between control node 9 such that communication path 61 returns to communication path 62.

Next, as shown in FIG. 35, control node 9 transmits a loopback instruction A' to ring node 10B. By means of receiving this loopback instruction A', ring node 10B implements a loopback between control node 9 such that communication path 62 returns to communication path 61.

After both ring node 10A and ring node 10B complete the loopback, expansion ring node 10F inserts between ring node 10A and ring node 10B as shown in FIG. 36 and forming a ring with additional ring node 10F. Thereafter, loopback release instruction is sent from control node 9 to both ring node 10A and ring node 10B. Because of this, ring node 10A and ring node 10B both release the loopback and clockwise communication path 61 is reset through expanded ring node 10F to complete the ring expansion operation.

As is understood from the description in FIG. 34 to FIG. 36, when expanding ring nodes in a conventional system, only the two ring nodes 10A, 10B adjacent to the node expansion location carried out the loopback to the control node 9 side and a loopback was not carried out in the side where ring node 10F is being expanded.

Thus, for example, communication path 61 between camera 11A and monitor device 11B was interrupted and communication between both was not allowed during the period between after ring node 10A in FIG. 34 carried out a loopback until ring node 10B in FIG. 35 completed a loopback.

Even if a loopback instruction was simultaneously transmitted to ring node 10A and ring node 10B, because each ring node 10A, 10B are operated by control programs independent of each other, a time difference would occur in the loopbacks and communication between camera 11A and monitor device 11B would be interrupted for the period corresponding to that difference.

Further, when reducing ring nodes, there was a control in which the two corresponding ring nodes would loopback and then the loopback would be released. For this case however, in a conventional system, wherein only the two ring nodes which received loopback instructions would carry out a loopback on the control node side 9, a communication interruption between camera 11A and monitor device 11B could not be avoided identical to when ring nodes are expanded.

Further, according to a conventional system, wherein a loopback was only carried out on one side, the communication path would still be in a momentary interruption state even if the loopback was released after, for example, recovering a fault and of course a communication interruption between camera 11A and monitor device 11B could not be avoided.

As described above, one construction mode of a communication network system in the fields of railroad management or a roadway management was a plurality of ring systems having the configuration as shown in FIG. 32.

In addition, when constructing this type of communication network system, the following configuration was considered ordinary.

Using one ring node for each of the ring systems as a line-gathering node and further providing a relay switch that relays data from these line-gathering nodes to a relay circuit.

To make the double relay systems, special devices are provided to control the switching of these relay systems.

Therefore, when constructing a network that covers a ring shaped region using the ring system, the necessity of arranging the ring nodes in contact with line-gathering nodes at positions where a relay is carried out worsened the efficiency of node utilization. In addition, there were problems of increasing complexity of the configuration and the unavoidable increases in cost.

Further, because the basic configuration in the conventional system is complex, it is difficult to achieve a configuration, wherein a relay system is doubled and even if it could be obtained, specialized devices were necessary to control these doubled relay systems with a problem of further increases in system cost.

Moreover, in a conventional communication network system that utilizes the ring system shown in FIG. 32, irregardless of whether this ring system was a single unit or a plurality of units, a loopback would only be carried out on the side that received a loopback instruction in the two ring nodes which received a loopback instruction when the ring nodes were being expanded, reduced or when a fault was being restored. A loopback was not carried out on the side where the ring nodes were being expanded, reduced or where a fault was being restored.

When ring nodes were being expanded, reduced or when a fault was being restored during communication between arbitrary local communication terminals, the communication path between the local communication terminals would be in a momentary interruption during the period between after one of the ring nodes started a loopback until the another ring node completed a loopback (or the period between after one of the ring nodes started loopback release until the another ring node completed loopback release) resulting in a problem of communication between the local communication terminals being interrupted.

SUMMARY OF THE INVENTION

The first object of the present invention is to provide a communication network system that does not require line-gathering nodes for each of the ring systems as well as simplifies the configuration and reduces the cost when constructing a system using a plurality of ring systems.

A second object of the present invention is to provide a communication network system that can simplify the double construction of the relay system as well as simplify the method to switch the doubled relay system when constructing a system using a plurality of ring systems.

A third object of the present invention is to provide a communication network system and loopback control method that can deal with expansion and reduction or fault restoration of node devices without interrupting communication between local communication terminals within ring systems.

In order to achieve the third object, the invention of claim 1 is a communication network system, wherein a plurality of node devices and a control node device that controls this plurality of node devices are connected in a ring shape by means of the ring circuits that can set a first communication path and a second communication path in a direction opposite to the first communication path and that during normal operation carries out transmission of data through the first communication path between each of the node devices or between communication terminals connected to each of the node devices. Furthermore, the control node device comprises a loopback control instruction method that issues loopback instructions or loopback release instructions to an arbitrary node device and each of the node devices comprise loopback control methods which loopback the first communication path to the second communication path on both the left and right sides of the ring circuits as seen from the devices themselves based on the loopback instructions and which also release the loopback based on the loopback release instructions.

In the invention of claim 1, the invention of claim 2 is characterized by being further comprised by a terminal management device that is connected to a control node device and this terminal management device comprises an instruction method that instructs a loopback request or loopback release request together with the name of the request target node device to the control node device and in addition the control node device issues a loopback instruction or loopback release instruction to applicable node devices within a ring based on the instructions from the terminal management device.

In the invention of claim 2, the invention of claim 3 is characterized by a terminal management device executing the following procedures when node devices are expanded within the rings; a first expansion procedure that carries out the loopback request for one node device out of two node devices adjacent to the expansion location that should undergo loopback control, a second expansion procedure that carries out the loopback request for the other node device out of two node devices that should undergo loopback control, a third expansion procedure that carries out the loopback release request for a node device that previously received the loopback request and should undergo loopback release after the expansion operation of the expansion target node device competes, and a fourth expansion procedure that carries out the loopback release request for a node device that subsequently received the loopback request and should undergo loopback release.

In the invention of claim 2, the invention of claim 4 is characterized by a terminal management device executing the following procedures when node devices are reduced within the rings; a first reduction procedure that carries out the loopback request for one node device out of two node devices adjacent to the reduction location that should undergo loopback control, a second reduction procedure that carries out the loopback request for the other node device out of two node devices that should undergo loopback control, a third reduction procedure that carries out the loopback release request for a node device that previously received the loopback request and should undergo loopback release after the expansion operation of the reduction target node device competes, and a fourth reduction procedure that carries out the loopback release request for a node device that subsequently received the loopback request and should undergo loopback release.

In the invention of claim 2, the invention of claim 5 is characterized by a terminal management device executing the following procedures when a fault occurs in node devices within the rings; a first fault restoration procedure that carries out the loopback request for one node device out of two node devices adjacent to the location where the fault occurred that should undergo loopback control, a second fault restoration procedure that carries out the loopback request for the other node device out of two node devices that should undergo loopback control, a third fault restoration procedure that carries out the loopback release request for a node device that previously received the loopback request and should undergo loopback release after the fault recovering operation of the node device where a fault occurred competes, and a fourth fault restoration procedure that carries out the loopback release request for a node device that subsequently received the loopback request and should undergo loopback release.

In the invention of claim 1, the invention of claim 6 is characterized by the ring circuits comprising an asynchronous transfer mode (ATM) circuit that can set virtual paths of two levels of virtual paths (VP) and virtual channels (VC). This invention is further characterized by a node device being comprised by an ATM switching device that switches and outputs an ATM cell (input from the transmission path to an input port) to the transmission path through an output port in accordance with a virtual path identifier and a virtual channel identifier contained within the ATM cell.

In the invention of claim 1, the invention of claim 7 is characterized by the ring circuits being formed by a wire circuit.

In the invention of claim 1, the invention of claim 8 is characterized by the ring circuits formed by a radio circuit.

Furthermore, the invention of claim 9 is a method, wherein a plurality of node devices and a control node device that controls this plurality of node devices are connected in a ring shape by means of the ring circuits that can set a first communication path and a second communication path in a direction opposite to the first communication path and that during normal operation carries out transmission of data through the first communication path between each of the node devices or between communication terminals connected to each of the node devices and even further is a method that carries out a loopback and loopback release between the first communication path and the second communication path. Loopback instructions or loopback release instructions are issued to an arbitrary node device from the control node device and each of the node devices are arranged such that they loopback the first communication path to the second communication path on both the left and right sides of the rings as seen from the devices themselves based on the loopback instructions and which also release the loopback based on the loopback release instructions.

In the invention of claim 9, the invention of claim 10 is characterized by being further comprised by a terminal management device that is connected to a control node device and this terminal management device instructs a loopback request or loopback release request together with the name of the request target node device to the control node device and in addition the control node device issues a loopback instruction or loopback release instruction to applicable node devices within a ring based on the instructions from the terminal management device.

In the invention of claim 10, the invention of claim 11 is characterized by a terminal management device executing the following procedures when node devices are expanded within the rings; a first expansion procedure that carries out the loopback request for one node device out of two node devices adjacent to the expansion location that should undergo loopback control, a second expansion procedure that carries out the loopback request for the other node device out of two node devices that should undergo loopback control, a third expansion procedure that carries out the loopback release request for a node device that previously received the loopback request and should undergo loopback release after the expansion operation of the expansion target node device competes, and a fourth expansion procedure that carries out the loopback release request for a node device that subsequently received the loopback request and should undergo loopback release.

In the invention of claim 10, the invention of claim 12 is characterized by a terminal management device executing the following procedures when node devices are reduced within the rings; a first reduction procedure that carries out the loopback request for one node device out of two node devices adjacent to the reduction location that should undergo loopback control, a second reduction procedure that carries out the loopback request for the other node device out of two node devices that should undergo loopback control, a third reduction procedure that carries out the loopback release request for a node device that previously received the loopback request and should undergo loopback release after the expansion operation of the reduction target node device competes, and a fourth reduction procedure that carries out the loopback release request for a node device that subsequently received the loopback request and should undergo loopback release.

In the invention of claim 10, the invention of claim 13 is characterized by a terminal management device executing the following procedures when a fault occurs in node devices within the rings; a first fault restoration procedure that carries out the loopback request for one node device out of two node devices adjacent to the location where the fault occurred that should undergo loopback control, a second fault restoration procedure that carries out the loopback request for the other node device out of two node devices that should undergo loopback control, a third fault restoration procedure that carries out the loopback release request for a node device that previously received the loopback request and should undergo loopback release after the fault recovering operation of the node device where a fault occurred competes, and a fourth fault restoration procedure that carries out the loopback release request for a node device that subsequently received the loopback request and should-undergo loopback release.

In the invention of claim 9, the invention of claim 14 is characterized by the ring circuits comprising an asynchronous transfer mode (ATM) circuit that can set virtual paths of two levels of virtual paths (VP) and virtual channels (VC). This invention is further characterized by a node device being comprised by an ATM switching device that switches and outputs an ATM cell (input from the transmission path to an input port) to the transmission path through an output port in accordance with a virtual path identifier and a virtual channel identifier contained within the ATM cell.

According to the inventions of claim 1 to claim 14, because two node devices which received loopback instructions are provided with an x type loopback function that carries out loopbacks for communication paths on both the left and right sides of the rings, even if a time difference occurs in a loopback or loopback release when carrying out a loopback in two node devices or when releasing that loopback, the current communication path will not be interrupted. Therefore, by means of utilizing this x type loopback function, it is possible to deal with expansion and reduction or fault restoration of node devices without interrupting communication.

DESCRIPTION OF THE PREFERRED EMBODIMENTS

Figure 1:
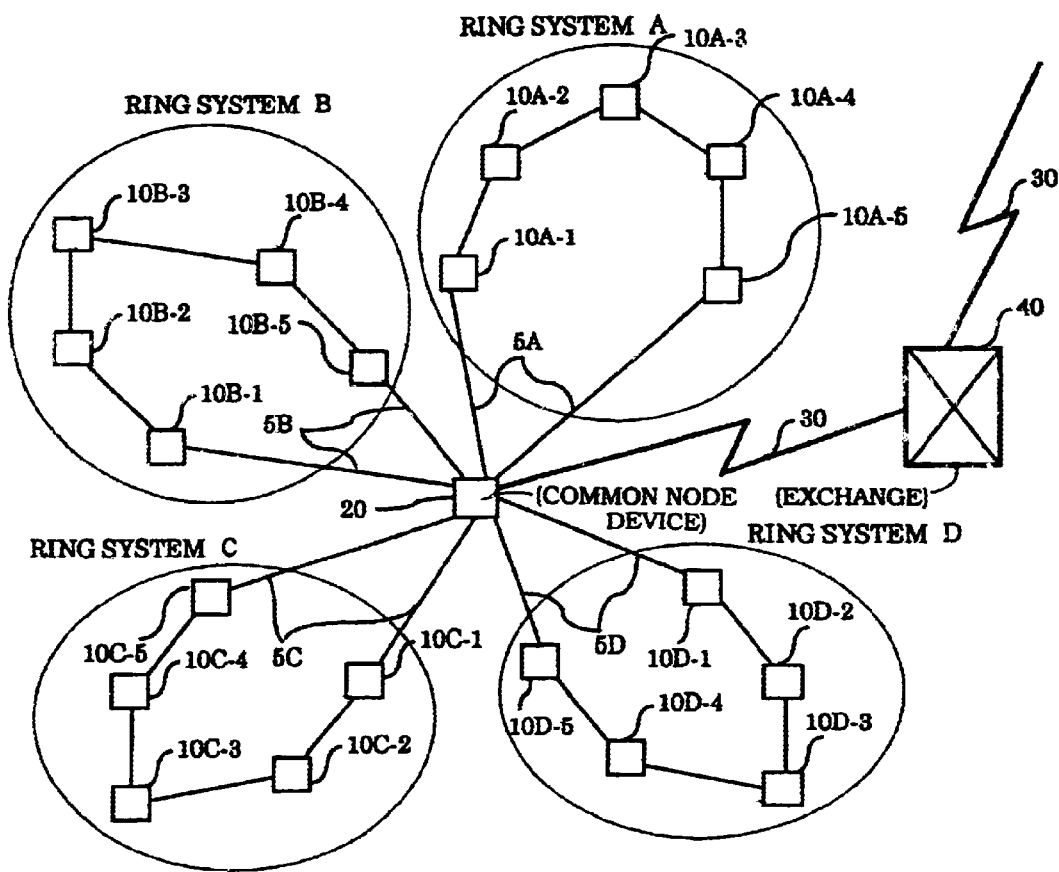
FIG. 1 shows a schematic representation of a communication network system according to a first embodiment of the present invention.

In the following, preferred embodiments of the present invention will be described with reference to the attached drawings. FIG. 1 shows a schematic representation of a communication network system according to a first embodiment of the present invention. This network system comprises four ring systems A, B, C, D which cover the region indicated by the dotted lines, a common node device 20 (hereinafter referred to as common node) that is connected in common to ring circuits 5A, 5B, 5C, 5D of each of the ring systems A, B, C, D and that gathers data from each of the ring circuits 5A, 5B, 5C, 5D relaying it to a relay circuit 30, and a exchange 40 that is inserted into relay circuit 30.

Ring system A comprises, for example, connecting five ring nodes 10A-1, 10A-2, 10A-3, 10A-4, 10A-5 in a ring shape by means of the ring circuit 5A using optical fiber or another similar material. For example, an ATM switching device is used as these ring nodes 10A-1, 10A-2, 10A-3, 10A-4, 10A-5.

The ATM switching device is located within an ATM switching network obtained by means of two levels of networks which are called a VP (Virtual Path) and VC (Virtual Channel) and has a function that carries out switch processing of fixed length cells (ATM cell) which are input from an input port in accordance with a VPI (Virtual Path Identifier) and a VCI (Virtual Channel Identifier) which are contained within the ATM cell. Further, although not shown in FIG. 1, either one or a plurality of local communication terminals are connected to each ring node 10A-1, 10A-2, 10A-3, 10A-4, 10A-5.

Figure 32:
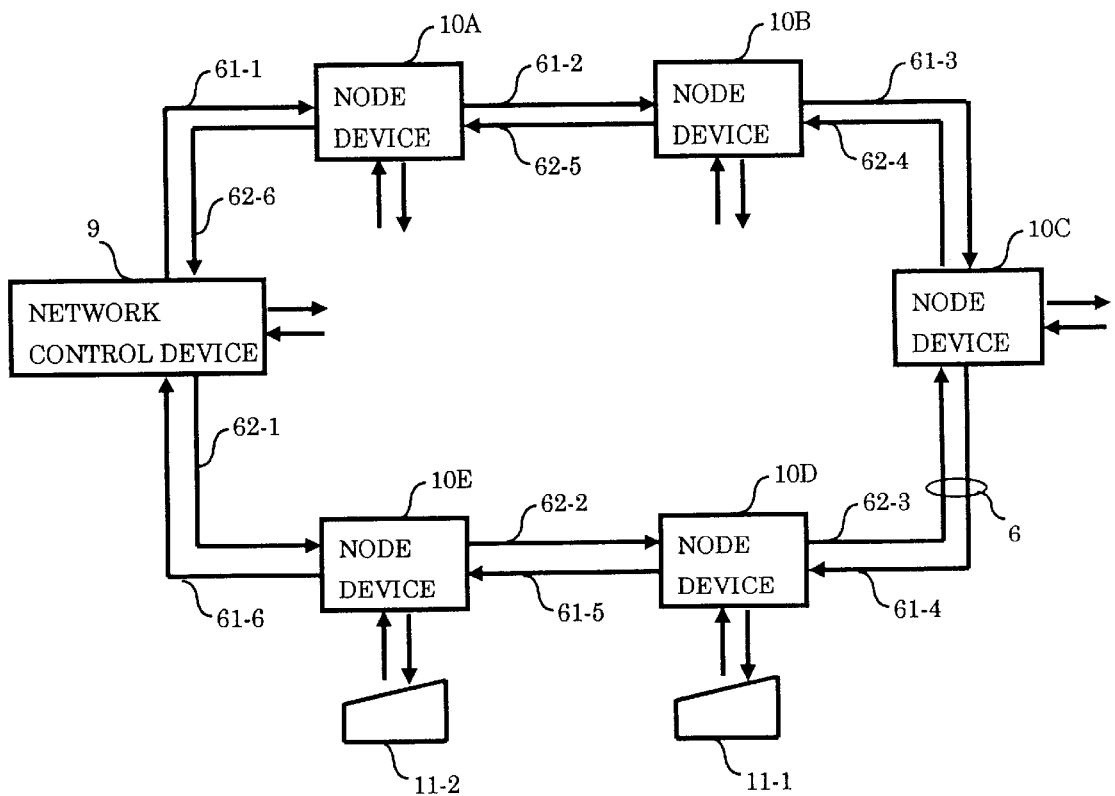
FIG. 32 shows a basic configuration of a ring system.
Figure 33:
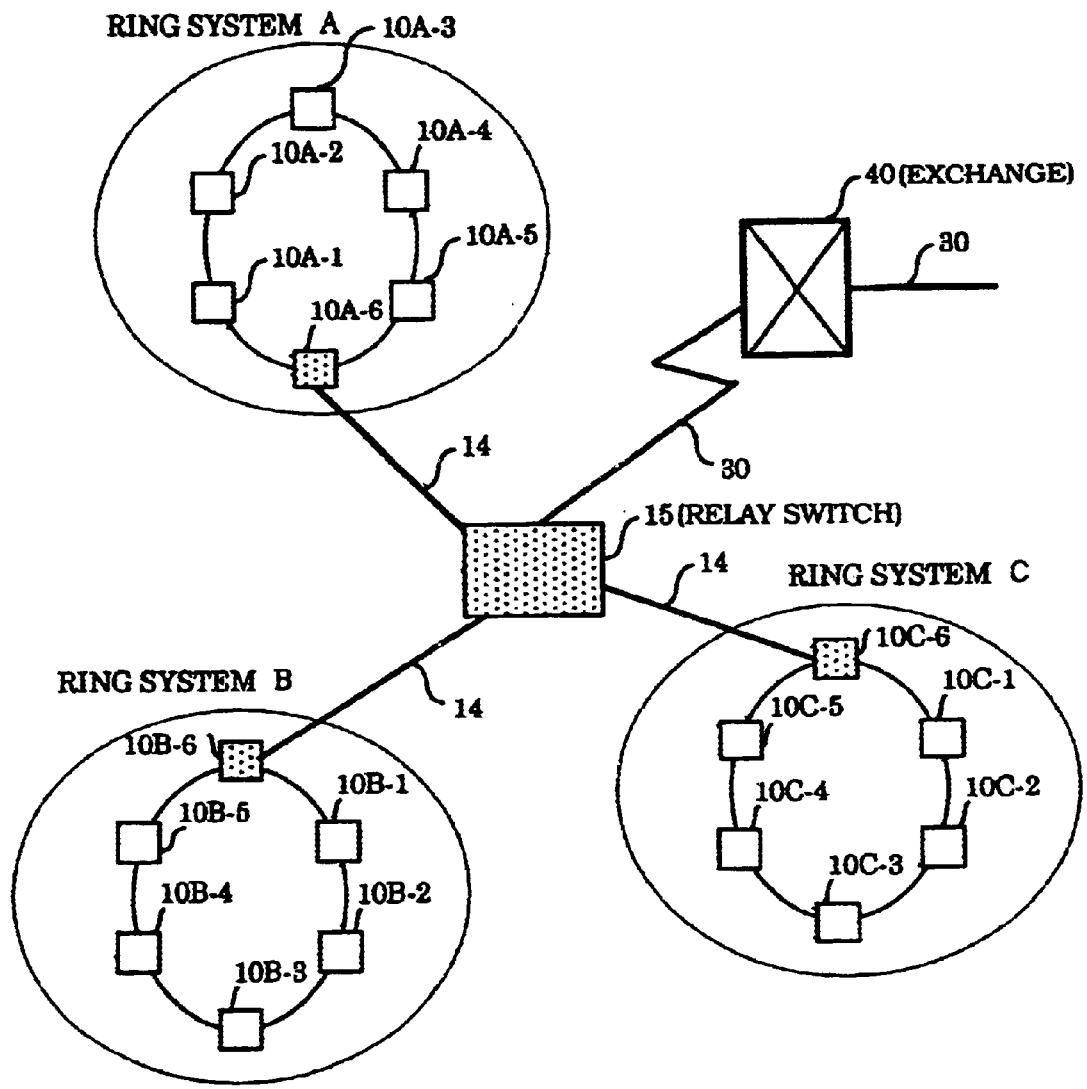
FIG. 33 shows a conventional example of a communication network system comprising a plurality of ring systems.
Figure 34:
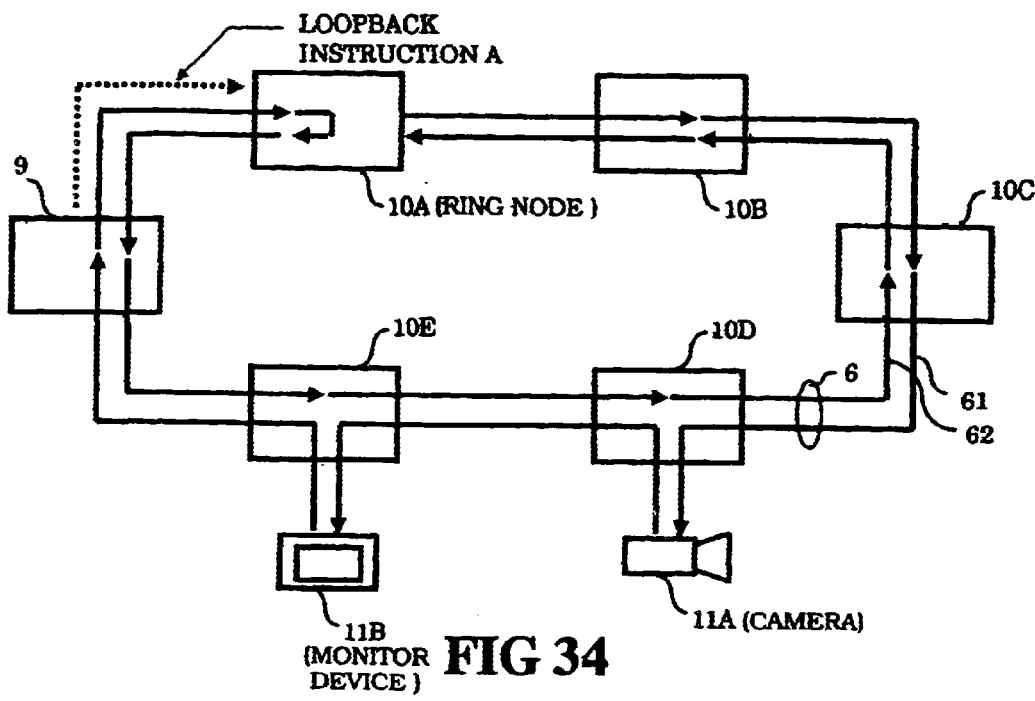
FIG. 34 shows a communication path setting condition at the initial time during a node expansion in a conventional ring system.
Figure 35:
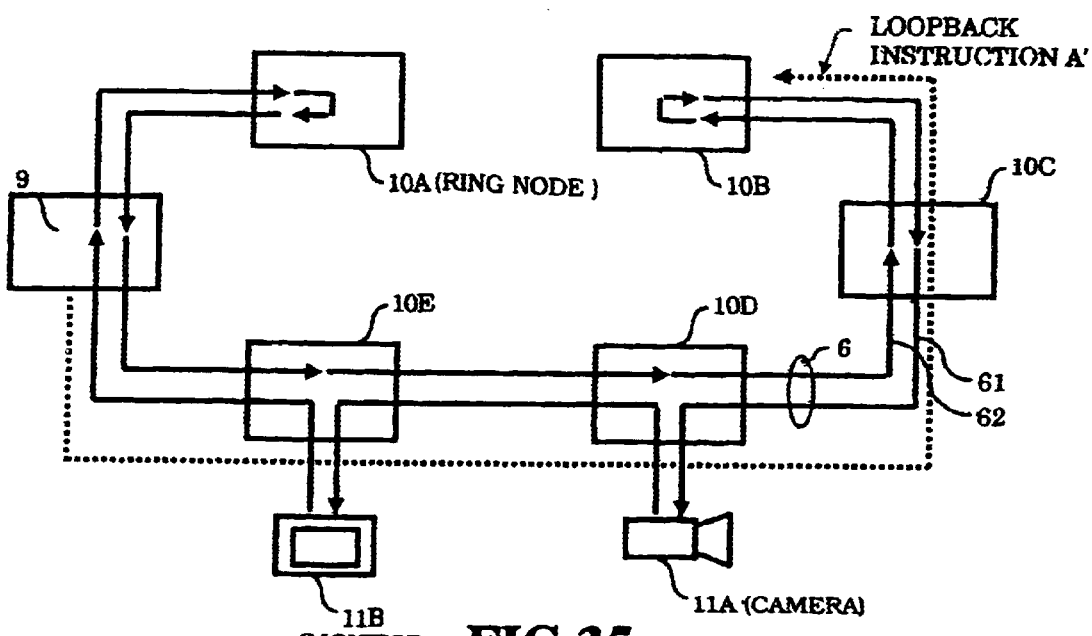
FIG. 35 shows a communication path setting condition when continued in FIG. 34.
Figure 36:
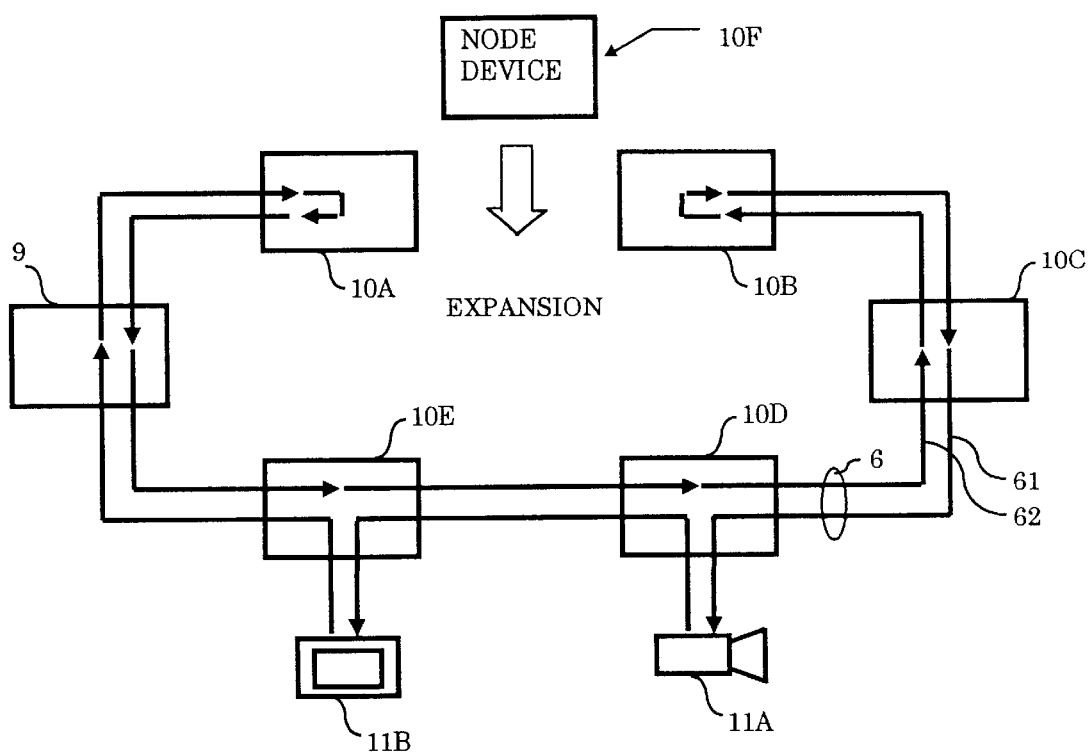
FIG. 36 shows a communication path setting condition when node expansion completes in the conventional ring system above.

The configuration of ring system A itself is fundamentally the same as the ring system shown in FIG. 32 except for the fact that ring circuit 5A is not closed as one ring with the data in ring circuit 5A being contained in common node 20 that can relay this data to relay circuit 30.

Moreover, the configuration of ring system B, ring system C and ring system D are also fundamentally the same as ring system A.

Namely, ring system B is an ATM ring system formed by using ring circuit 5B to connect five ring nodes 10B-1, 10B-2, 10B-3, 10B-4, 10B-5 each of which contain either one or a plurality of local communication terminals.

Ring system C is an ATM ring system formed by using ring circuit 5C to connect five ring nodes 10C-1, 10C-2, 10C-3, 10C-4, 10C-5 each of which contain either one or a plurality of local communication terminals.

Ring system D is an ATM ring system formed by using ring circuit 5D to connect five ring nodes 10D-1, 10D-2, 10D-3, 10D-4, 10D-5 each of which contain either one or a plurality of local communication terminals.

Next, referring to FIG. 2, a containment mode of ring circuits 5A, 5B, 5C, 5D of each of the ring systems A, B, C, D in common node 20 and relay circuit 30 will be described.

Figure 2:
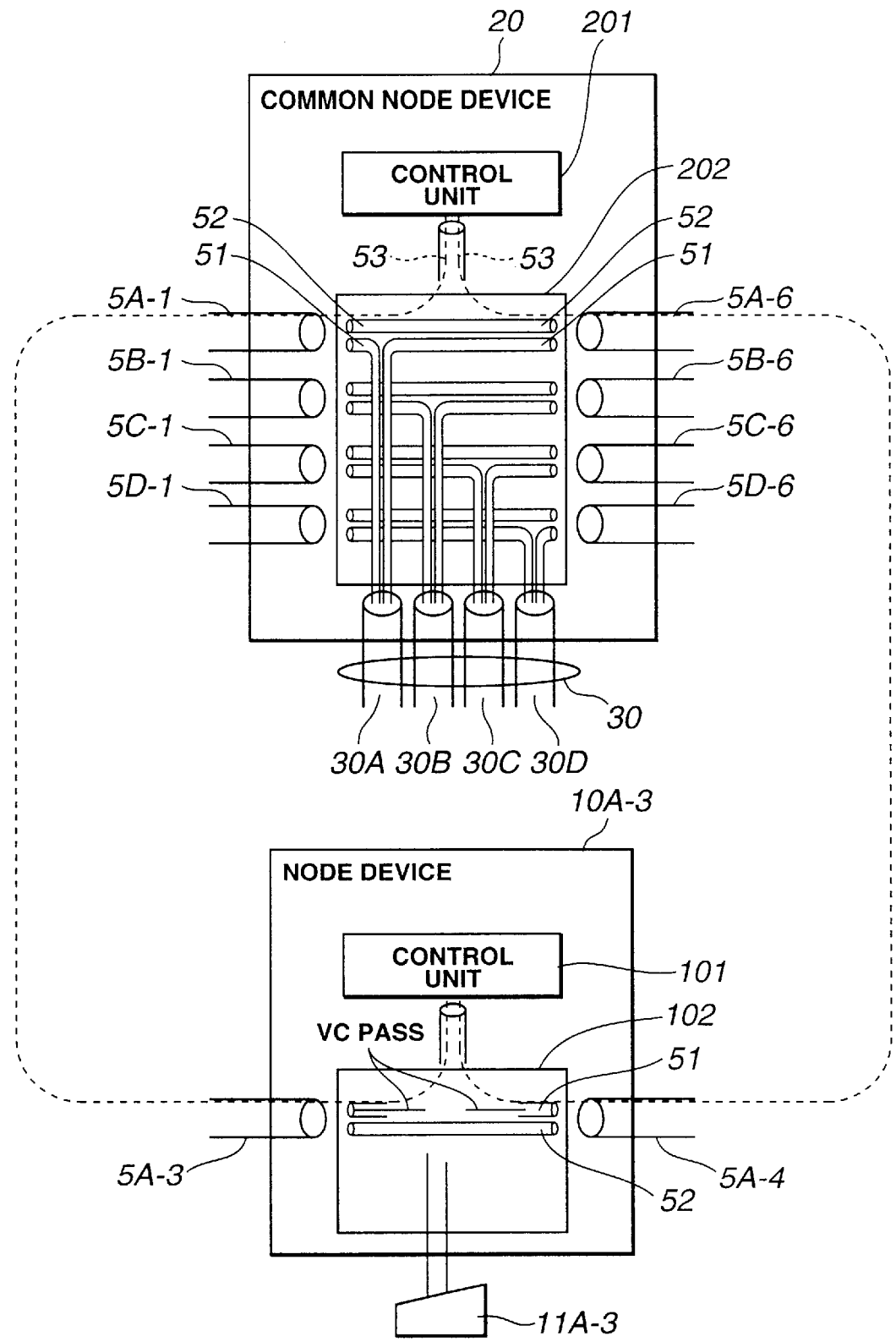
FIG. 2 shows pass setting of ring circuits and a relay circuit in a common node of the first embodiment.

As shown in FIG. 2, common node 20 comprises control portion 201 and switch portion 202. Control portion 201 has a switching table (not shown in figure) that registers an input port and an output port of a cell in correspondence to VPI and VCI and then controls the cell switching operation of switch portion 202 in accordance with this switching table.

Switching portion 202 carries out the operation of cell switching, wherein an input cell is sent through an output port that corresponds to the input port of that cell. Ring circuits 5A, 5B, 5C, 5D of ring systems A, B, C, D and relay circuits 30A, 30B, 30C, 30D which correspond to each of these ring systems A, B, C, D are contained in the I/O port of switching portion 202 as shown in this figure.

For example, looking at ring system A, ring circuit 5A-1 is terminated connecting to ring node 10A-1, and ring circuit 5A-6 is terminated connecting to ring node 10A-5. Further, although not shown in FIG. 2, each ring circuit 5A-2, 5A-3, 5A-4, 5A-5 is connected between ring circuit 5A-1 and ring node 10A-6 through ring nodes 10A-1, 10A-2, 10A-3, 10A-4, 10A-5. As a whole, ring circuits 5A-1, 5A-2, 5A-3, 5A-4, 5A-5, 5A-6 form one ring circuit 5A (see FIG. 3).

In switch portion 202, VP path 51 forms between this ring circuit 5A (5A-1, 5A-2, 5A-3, 5A-4, 5A-5, 5A-6) and the relay circuit 30A (provided in correspondence to ring system A) together with VP switching path settings being set such that VP path 52 forms within ring circuit 5A.

VP path 51 is a virtual path that can set VC paths used for communication between local communication terminals through each of the ring nodes 10A-1, 10A-2, 10A-3, 10A-4, 10A-5 within ring system A. The conditions shown in this figure are such that local communication terminal 11A-3 contained in ring node 10A-3 within ring system A is set as the target and relay transmission between relay circuit 30A is carried out through common node 20.

Moreover, as understood from this figure, ring node 10A-3 comprises switch portion 102 that carries out the cell switching operation for the relay transmission and control portion 101 that carries out control of the cell switching operation switch portion 102 in accordance with the switching table, wherein is registered the input port and output port of the cell in correspondence with VPI and VCI. And even further, ring node 10A-3 also has a configuration identical to other ring nodes 10A-1, 10A-2, 10A-3, 10A-4, 10A-5 within the ring system A.

In contrast, VP path 52 formed within ring circuit 5A is a virtual path that can set a VC path in order to loopback communication using a VC path within the VP path 51 and is set in a direction opposite to VP path 51.

Even further, control path 53 that can be set is provided within ring circuit 5A as shown by the dotted line in FIG. 2. This control path 53 is set between control portion 201 of common node 20 and control portion 101 of each ring node 10A-1, 10A-2, 10A-3, 10A-4, 10A-5 and is used to control each of the ring nodes 10A-1, 10A-2, 10A-3, 10A-4, 10A-5 from common node 20.

The following is given an example of this control. A loopback instruction is sent from control portion 201 of common node 20 to control portion 101 of the applicable ring node from among ring nodes 10A-1, 10A-2, 10A-3, 10A-4, 10A-5 and then the VC path within VP path 51 during transmission is loop backed by that ring node to a VC path within VP path 52.

A containment mode of ring circuits 5B, 5C, 5D relay circuit 30 of the other ring system B, C, D in common node 20 and relay circuit 30 is also identical to the containment mode of ring system A.

Namely, looking at ring system B, in switch portion 202, ring circuit 5B-1 is terminated connecting to ring node 10B-1 and ring circuit 5B-6 is terminated connecting to ring node 10B-6. And in addition, VP path 51 forms between this ring circuit 5B (5B-1, 5B-2, 5B-3, 5B-4, 5B-5, 5B-6) and relay circuit 30B (provided in correspondence to ring system B) together with VP switching path settings being set to allow VP path 52 and control path 53 to form within ring circuit 5B.

Furthermore, looking at ring system C, in switch portion 202, ring circuit 5C-1 is terminated connecting to ring node 10C-1 and ring circuit 5C-6 is terminated connecting to ring node 10C-6. And in addition, VP path 51 forms between this ring circuit 5C (5C-1, 5C-2, 5C-3, 5C-4, 5C-5, 5C-6) and relay circuit 30C (provided in correspondence to ring system C) together with VP switching path settings being set to allow VP path 52 and control path 53 to form within ring circuit 5C.

Even further, looking at ring system D, in switch portion 202, ring circuit 5D-1 is terminated connecting to ring node 10D-1 and ring circuit 5C-6 is terminated connecting to ring node 11D-6. And in addition, VP path 51 forms between this ring circuit 5D (5D-1, 5D-2, 5D-3, 5D-4, 5D-5, 5D-6) and relay circuit 30D (provided in correspondence to ring system D) together with VP switching path settings being set to allow VP path 52 and control path 53 to form within ring circuit 5D.

Next, the communication operation of this network system will be described.

Here emphasis will be placed on describing a case when arbitrary local communication terminals connected to ring nodes 10A-1, 10A-2, 10A-3, 10A-4, 10A-5 within ring system A communicate through common node 20 by means of relay circuit 30A.

Figure 3:
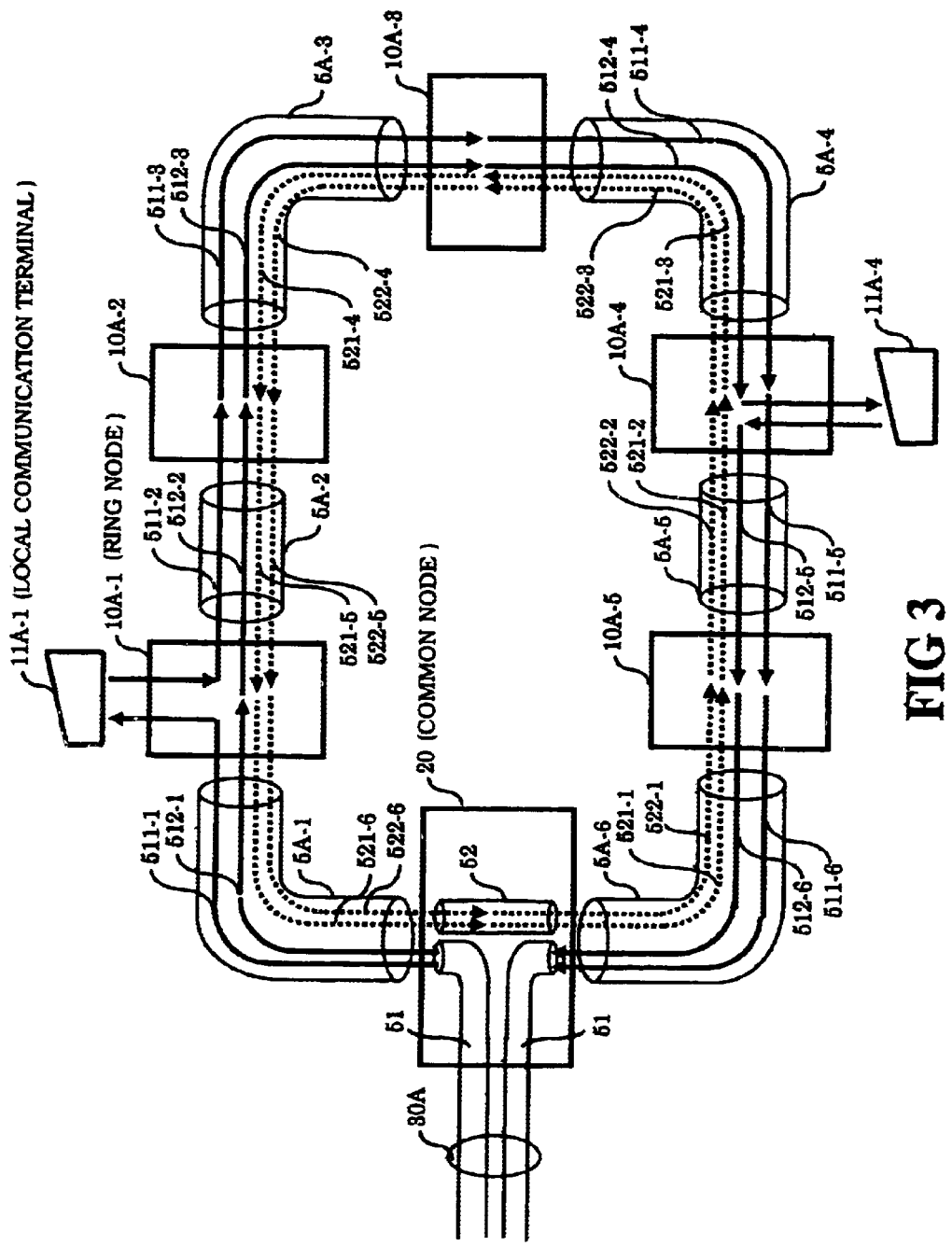
FIG. 3 shows the circuit configuration of a relay portion between ring system A within a common node and the ring system A.

FIG. 3 is an outline view showing only a cutaway view of the circuit configuration of a relay portion suitable for ring system A from among the relay portions of ring system A, B, C, D in common node 20 of this network system.

In this figure, relay circuit 30A that gathers and relays data of ring system A is contained in ring circuit 5A of the ring system A as well as in common node 20. Ring circuit 5A comprises common node 20, ring circuit 5A-1 between common node 20 and ring node 10A-1, ring circuit 5A-2 between ring node 10A-1 and ring node 10A-2, ring circuit 5A-3 between ring node 10A-2 and ring node 10A-3, ring circuit 5A-4 between ring node 10A-3 and ring node 10A-4, ring circuit 5A-5 between ring node 10A-4 and ring node 10A-5, and ring circuit 5A-6 between ring node 10A-5 and common node 20.

Furthermore, only local communication terminal 11A-1 contained in ring node 10A-1 and local communication terminal 11A-4 contained in ring node 10A-4 are shown as the local communication terminals within ring system A.

In this circuit containment mode, common node 20 carries out VP switch path settings between ring circuit 5A and relay circuit 30A utilizing switch portion 202 as described in FIG. 2 and all VP paths within ring system A are contained by means of this VP switch path. Thereby, if the VP switch path settings within common node 20 are set once, operations to set the path for those reasons in common node 20 become unnecessary when expanding or reducing the communication paths following either expansion or reduction of the ring nodes.

As a definite setting example of the VP switch path settings, in this figure VP path 51 forms between relay circuit 30A and ring circuit 5A (5A-1, 5A-2, 5A-3, 5A-4, 5A-5, 5A-6 and VP path 52 is set within ring circuit 5A.

Furthermore, in VP path 51, VC path 511 (511-1, 511-2, 511-3, 511-4, 511-5, 511-6) is set in order to carry out relay and transmission of local communication terminal 11A-1 contained in ring node 10A-1 and VC path 512 (512-1, 512-2, 5123, 512-4, 512-5, 512-6) is set in order to carry out relay and transmission of local communication terminal 11A-4 contained in ring node 10A-4.

In contrast, VC path 521 (521-1, 521-2, 521-3, 521-4, 521-5, 521-6) and VC path 522 (522-1, 522-2, 522-3, 522-4, 522-5, 522-6) used when looping back rings are set in a direction opposite to VP paths 511 and 512 within the VP 51. VP path 522 is a loopback VC path that corresponds to VC path 511 and VP path 522 is a loopback VC path that corresponds to VC path 512.

In the path setting conditions shown in FIG. 3, for example, the data sent from local communication terminal 11A-1 is transmitted up to common node 20 through VC paths 511-3, 511-4, 511-5, 511-6 after switching the output to VC path 511-2 using ring node 10A-1 and is then gathered by common node 20 and relayed to relay circuit 30A. Moreover, the data from relay circuit 30A destined for local communication terminal 11A-1 is switched and output to VC path 511-1 by common node 20, transmitted to ring node 10A-1 and then output to local communication terminal 11A-1 by ring node 10A-1.

In like manner, data sent from local communication terminal 11A-4 is transmitted up to common node 20 through VC path 512-6 after switching the output to VC path 512-5 using ring node 10A-4 and is then gathered by common node 20 and relayed to relay circuit 30A. Moreover, the data from relay circuit 30A destined for local communication terminal 11A-4 is switched and output to VC path 512-1 by common node 20 and then transmitted to ring node 10A-4 through VC paths 512-2, 512-3, 512-4 and output to local communication terminal 11A-4 by ring node 10A-4.

Further, data from local communication terminal 11A-1 relayed and transmitted to relay circuit 30A is switched to the other destination local communication terminal (for example, connected to the ring nodes within any system from among ring system B, C, D) by means of exchange 40 that is inserted into relay circuit 30A. And even further, the data sent from this other local communication terminal is switched to the destination local communication terminal 11A-1 by the exchange 40 and is then relayed and transmitted to local communication terminal 11A-1. Moreover, even during relay transmissions between local communication terminal 11A-4 and the other local communication terminal, exchange 40 carries out the same switching operation as above.

Figure 4:
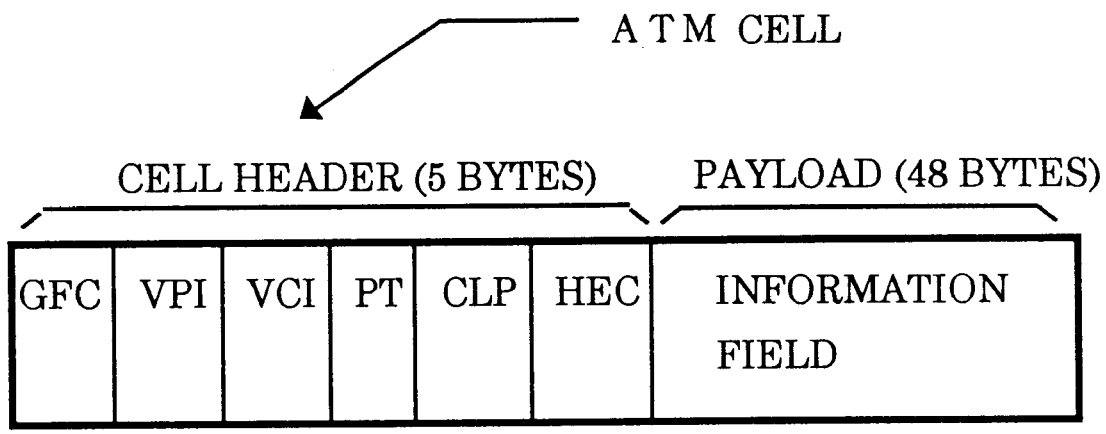
FIG. 4 shows the cell format of an ATM cell.

In the relay communication, the communication of local communication terminals 11A-1 or 11A-4 is transferred on VP path 51 as an ATM cell that comprises the format as shown in FIG. 4.

In other words, this ATM cell comprises a cell header portion and a payload portion. In the cell header portion is loaded GFC (Generic Flow Control), VPI, VCI, PT (Payload types), CLP (Cell Loss Priority) and HEC (Header Error Control) and the data to be transmitted in the data field of the payload portion is loaded in that data.

On VP path 51, each ring node 10A-1, 10A-2, 10A-3, 10A-4, 10A-5 carries out cell switching operations in accordance with each value of VPI VCI within the ATM cell above. Further, common node 20 achieves the VP switching control between relay circuit 30A by means of carrying out the cell switching operation referencing only the VPI values within that ATM cell.

Moreover, as understood from the above description, path connection settings are made to obtain data of each of the upper and lower communication during relay communication between local communication terminals 11A-1, 11A-4 and the other ring systems B, C, D utilizing reverse rotation of the rings. (see FIG. 3).

By means of this type of path connection setting, communication can be assisted even if a fault occurs within ring system A by looping back VC paths 511 and 512 during communication to VC paths 521 and 522 within VP path 52 using the two ring nodes adjacent to the fault.

For example, if a fault occurs in the transmission path between ring node 10A-2 and 10A-3 when local communication terminals 11A-1, 11A-4 carry out the communications (see FIG. 3), ring node 10A-2 can loop back VC path 511-2 and VC path 512-2 to VC path 521-5 and VC path 522-5 and ring node 10A-3 can loop back VC path 521-3 and VC path 522-3 to VC path 511-4 and VC path 512-4.

By means of utilizing this loopback, data sent from local communication terminal 11A-1 can be transferred to common node 20 on the so-called path consisting of VC paths 511-2, 521-5, 521-6, 521-3, 511-4, 511-5, 511-6 without passing the location where the fault occurred. Further, data destined for local communication terminal 11A-4 input via common node 20 from relay circuit 30A can be transferred to local communication terminal 11A-4 on the so-called path consisting of VC paths 512-1, 512-2, 522-5, 522-6, 521-1, 522-2, 522-3, 512-4 without passing the location where the fault occurred.

Moreover, in the description of FIG. 3, only the communication within ring system A was made reference to although in like manner, the communication within each of the ring systems B, C, D can be obtained through one VP switching path by means of passing through common node 20.

Even further, in the description of FIG. 3, it was previously mentioned that each ring circuit 5A, 5B, 5C, 5D of ring systems A, B, C, D and relay circuits 30A, 30B, 30C, 30D carried out path switching with a one-to-one correspondence. This one-to-one correspondence however, is not always necessary. For instance, as a modified example, when the VP resources (region) which match two circuits from among ring circuits 5A, 5B, 5C, 5D do not satisfy the region of one circuit from among relay circuits 30A, 30B, 30C, 30D, the two relay circuits can also be operated, namely, relayed to the one relay circuit.

In this network system that uses common node 20 to obtain relay communication between ring systems A, B, C, D through one VP switching path, it is possible to, for example, easily obtain a configuration, wherein relay circuit 30 is doubled. Further, for this case, switching all the relay communication between ring systems A, B, C, D can be handled utilizing a simple process, such as only switching the VP switch paths.

Figure 5:
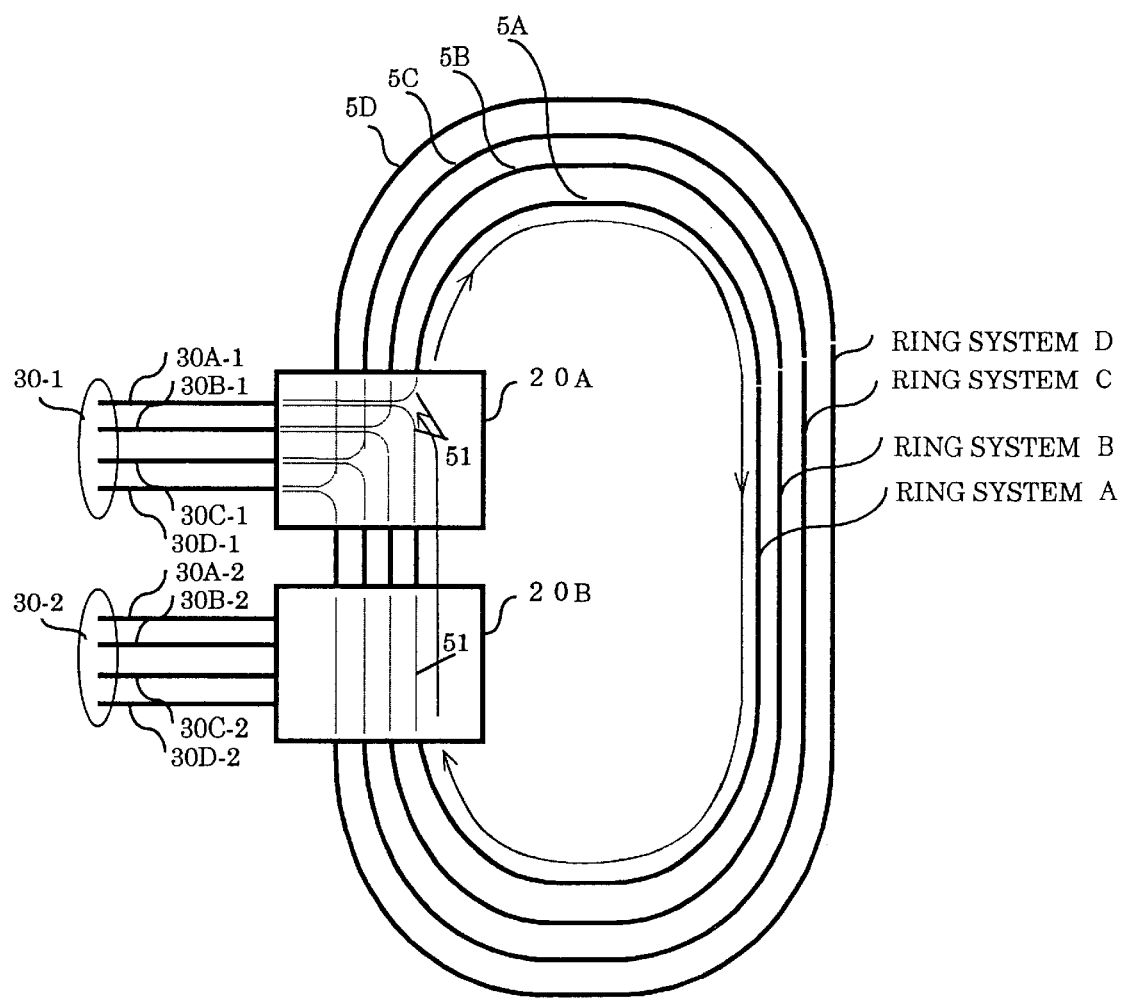
FIG. 5 shows a doubled relay circuit configuration of a network system according to a second embodiment of the present invention.

Next, a second embodiment will be described in which the relay circuit in the network system of the first embodiment is doubled. FIG. 5 is an outline view showing a configuration having double relay circuits in the network system of the second embodiment.

The network system of the second embodiment is the system of the first embodiment in which two common nodes 20A and 20B adjacent to each circuit 5A, 5B, 5C, 5D of each of the ring systems A, B, C, D are inserted.

Relay circuits 30-1 and 30-2 are contained in these common nodes 20A and 20B. Relay circuits 30A-1, 30B-1, 30C-1, 30D-1 used for ring systems A, B, C, D are disposed in relay circuit 30-1 and relay circuits 30A-2, 30B-2, 30C-2, 30D-2 used for ring systems A, B, C, D are disposed in relay circuit 30-2.

Common nodes 20A, 20B are both obtained by a configuration identical to common node 20 shown in FIG. 2. Further, in this embodiment, for example, common node 20A always operates as an active system and common node 20B is maintained in a standby state as a standby system.

In the active system of common node 20A, relay circuits 30A-1, 30B-1, 30C-1, 30D-1 undergo VP switching path connection to each ring circuit 5A, 5B, 5C, 5D of each of the corresponding ring systems A, B, C, D by means of VP path 51 indicated by the dotted lines of FIG. 5.

In contrast, in the standby system of common node 20B, settings are made such that VP path 51 on each of the ring circuits 5A, 5B, 5C, 5D enters a through state without relay circuits 30A-2, 30B-2, 30C-2, 30D-2 undergoing VP switching path connections to each ring circuit 5A, 5B, 5C, 5D of ring systems A, B, C, D.

Figure 6:
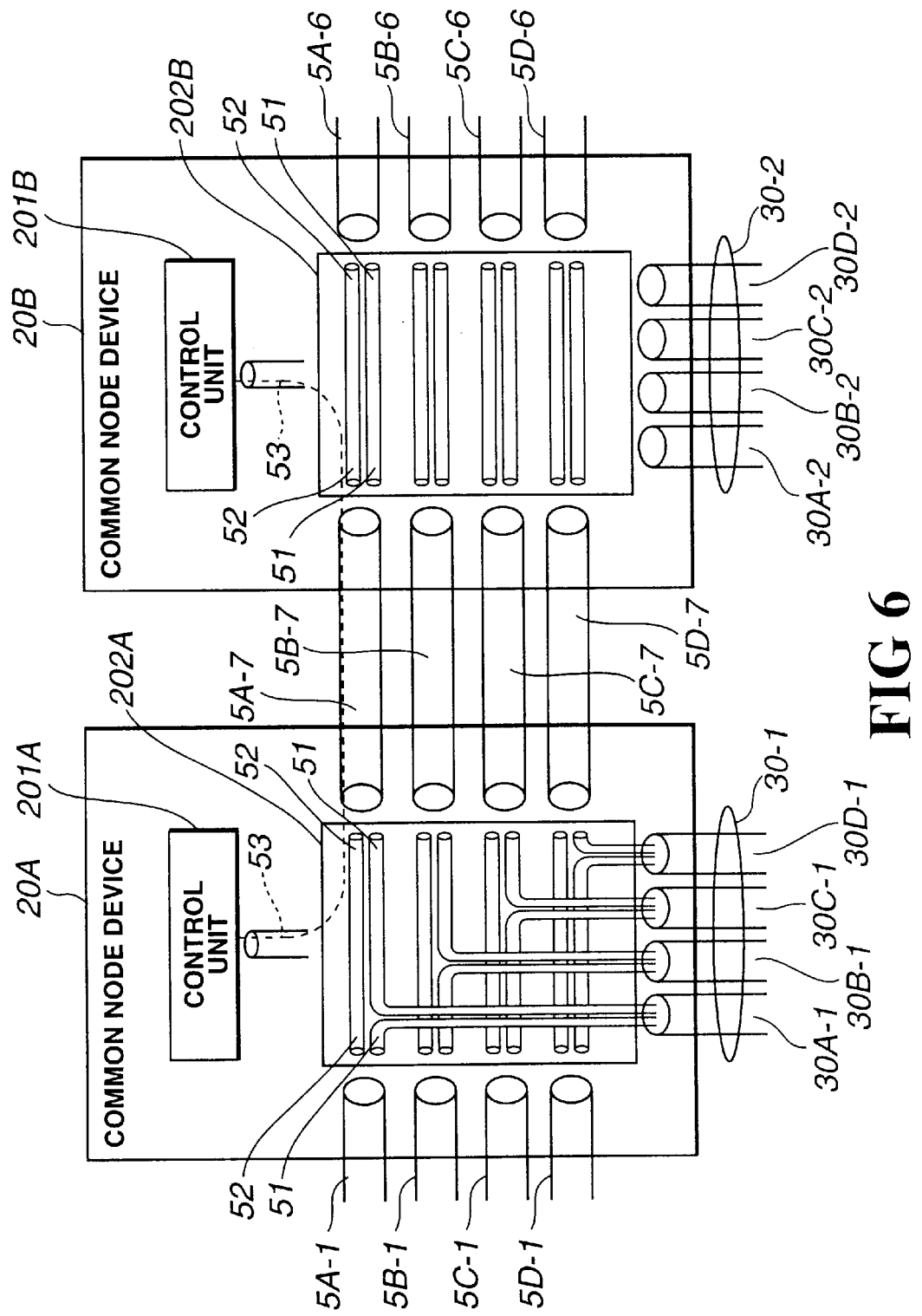
FIG. 6 shows a VP path setting condition of common node 20A and common node 20B in FIG. 5.

FIG. 6 is an outline view showing in more detail the VP path setting condition of common node 20A and common node 20B in FIG. 5.

Common node 20A is in a VP switching path setting condition that allows gathering and relays in like manner to FIG. 2 and common node 20B is in a set state that simply sets the VP path to a through state.

In this path setting condition, data from relay circuit 30A in ring circuit 5A-1 is, for example, VP switched in the direction of ring node 10A-1 (direction of arrow in FIG. 5) through the VP path 51 and then after passing through each ring node 10A-1, 10A-2, 10A-3, 10A-4, 10A-5, is input into common node 20B through ring circuit 5A-6.

By only allowing the data input into common node 20B to simply pass through VP path 51, this data is output to ring circuit 5A-7 and then common node 20A relays and transmits the data sent from that ring circuit 5A-7 to relay circuit 30A-1. Communication between the other relay circuits 30B-1, 30C-1, 30D-1 and ring circuits 5B, 5C, 5D is also carried out in an identical flow through common node 20A and common node 20B.

Figure 7:
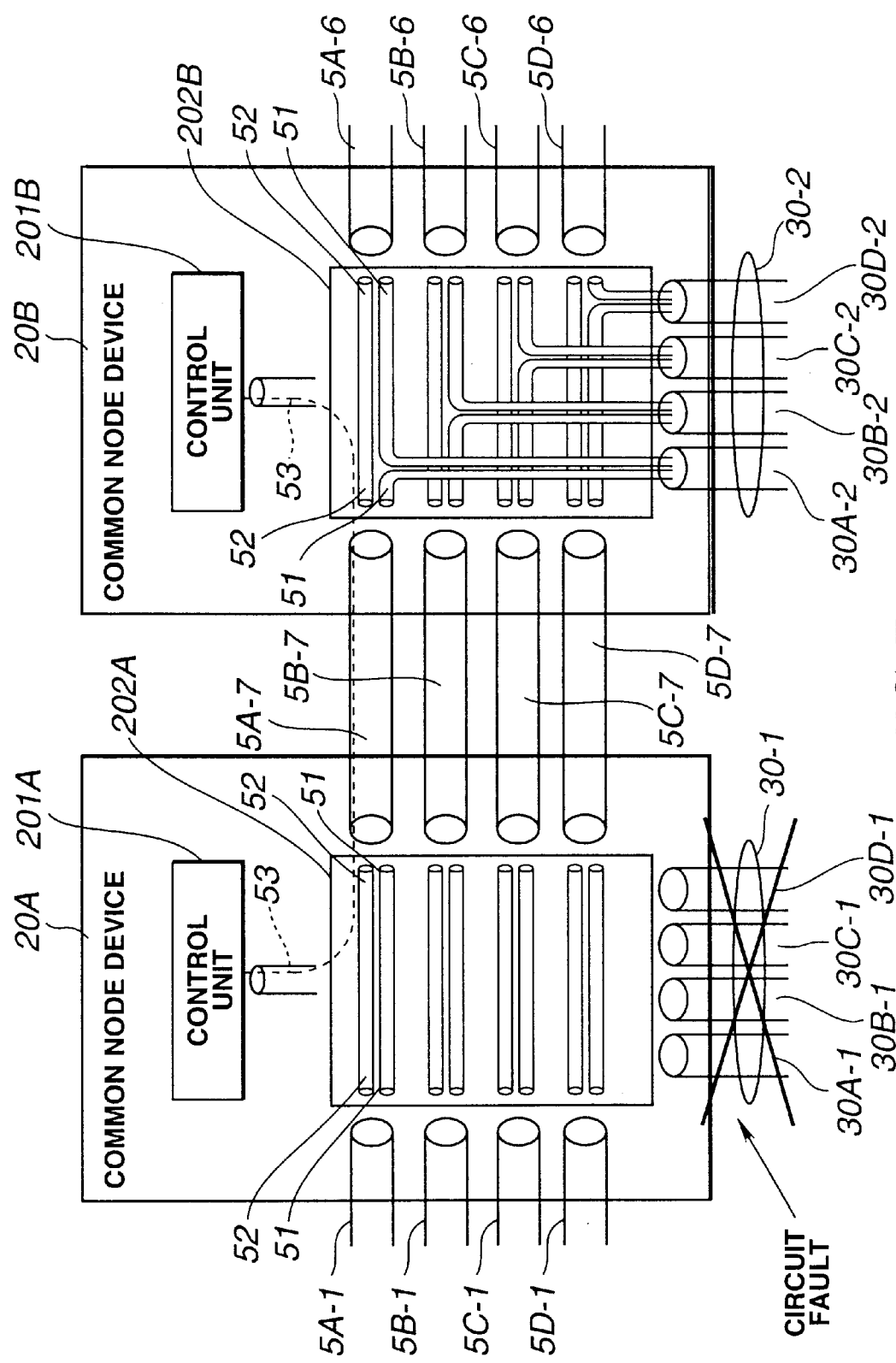
FIG. 7 shows an example of a VP path settings change control from a VP path setting condition in FIG. 6.

In the communication state, when control portion 201A monitors the cell switching operation and the result of the monitoring finds that a fault occurred in relay circuit 30A-1, by means of switching control data through control portion 201B of adjacent common node 20B and control path 53, control is carried out in order to change the VP path settings up to the present to the set state shown in FIG. 7 (see FIG. 6).

In FIG. 7, the active system of common node 20A that bears the responsibility for gathering and relays up to now interrupted the VP path between ring circuits 5A, 5B, 5C, 5D and relay circuit 30-1 and resets the VP path on ring circuits 5A, 5B, 5C, 5D to a through state. And in addition, the standby system of common node 20B that was not directly related to gathering and relays up to now sets the VP path between ring circuits 5A, 5B, 5C, 5D and relay circuit 30-2 which were in a VP path through state up to now. This type of VP path setting change makes it possible to assist communication when a fault of relay circuit 30-1 occurs.

An example will be provided in which the functions of the active system of common node 20A and the standby system of common node 20B completely switch when the entire relay circuit 30-1 becomes a fault. However, the relationship of the active system of common node 20A and the standby system of common node 20B remains as is without any changes for the occurrence of a single fault of each of the relay circuits 30A-1, 30B-1, 30C-1, 30D-1 within relay circuit 30-1 and in addition, it is also possible to change the VP path settings of single relay circuits where the fault occurred using the active system of common node 20A.

Figure 8:
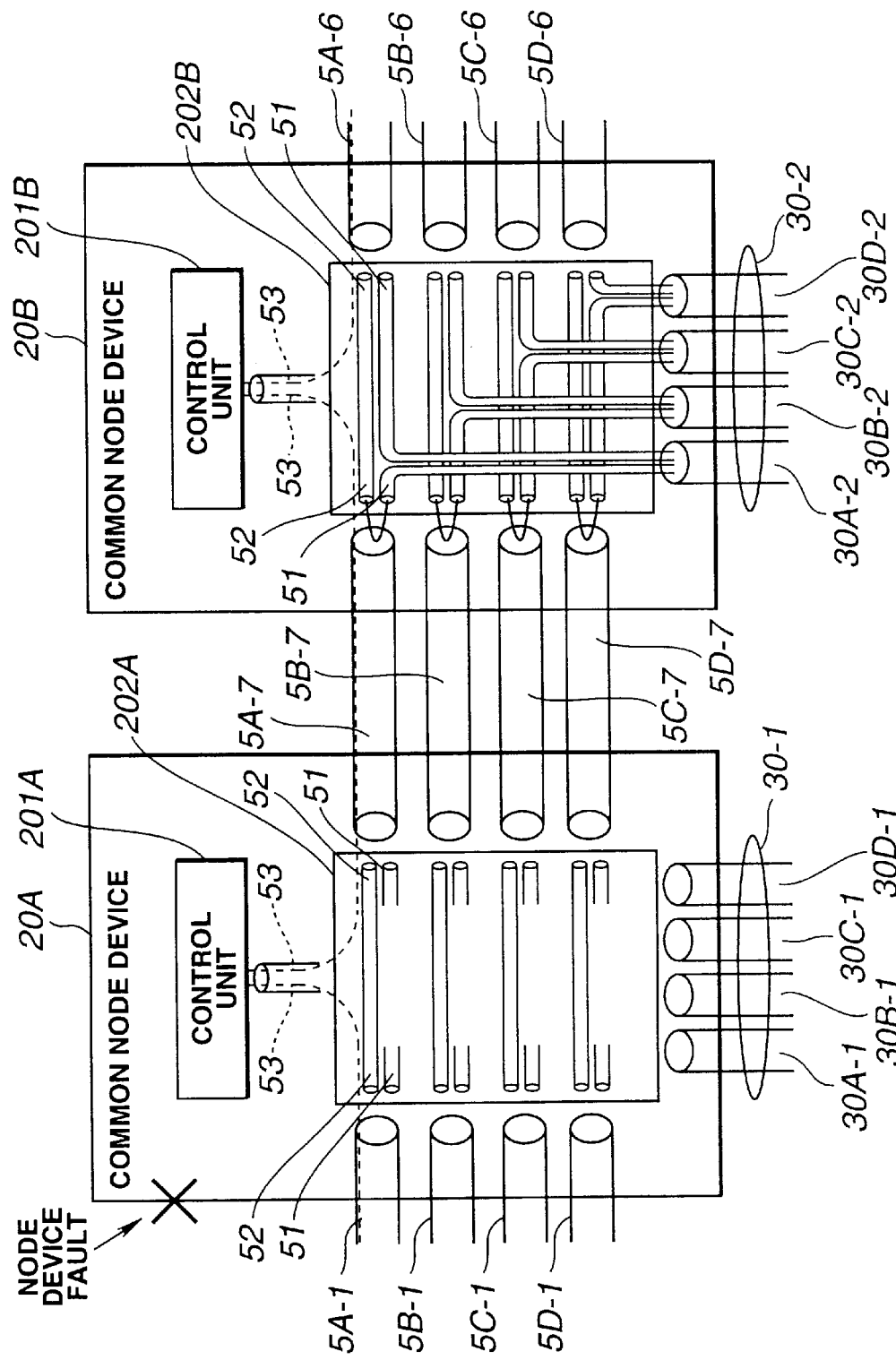
FIG. 8 shows another example of a VP path settings change control from a VP path setting condition in FIG. 6.

Even further, when common node 20A itself becomes a fault during communication in the VP path setting condition shown in FIG. 6, communication can be assisted by means of changing the settings of the VP path as shown in FIG. 8.

Namely, in FIG. 8, control portion 201B of common node 20B that detected the occurrence of a fault in common node 20A resets the VP path between ring circuits 5A, 5B, 5C, 5D and relay circuit 30-1 which were in a VP path through state up to now. And in addition, control portion 201B sets the VP path in order that each ring circuit 5A-7, 5B-7, 5C-7, 5D-7 are in a loopback state on the side adjacent to common node 20A where the fault occurred. Further, at this time, it goes without saying that on the side opposite to the side adjacent to common node 20A the most distant ring node (ring node adjacent to common node 20A where the fault occurred) also requires loopback control from common node 20B in each of the ring circuits 5A, 5B, 5C, 5D.

Moreover, as shown in FIG. 6 to FIG. 8, in order to carry out switching between common nodes 20A and 20B as well as between relay circuits 30-1 and 30-2 in the network system of this embodiment, wherein the relay circuit is doubled by 30-1 and 30-2, and common nodes 20A, 20B are arranged in correspondence to relay circuits 30-1, 30-2, the actual configuration that is necessary is one in which the common node 21A is arranged opposite common node 20A between relay circuit 30-1 and the common node 21B is arranged opposite common node 20B between relay circuit 30-2.

In FIG. 7, when, for example, the occurrence of a fault of relay circuit 30-1 causes a switch to relay circuit 30-2, common node 20A sets the VP path connection to a through state and simultaneous with that, the opposing common node 21A also carries out the same path settings. And also, common node 20B newly sets the VP path connection to relay circuit 30-2 and simultaneous with that, the opposing common node 21B must be controlled to set the same path settings.

This control, for example, makes it possible to set a node device with a rank higher than the common nodes 20A, 21A, 20B, 21B within the system and this ranking node device controlling common nodes 20A, 20B and common nodes 21A, 21B on the opposite side through a control path.

In the systems according to the first and second embodiments, because of the properties of this system which allow cover a wide region using a plurality of ring systems, there are many cases in which this system is forced to cover even wider systems. For this case it is necessary to expand the ring nodes within the ring system of the region.

In this type of ring system, using a loopback function which is utilized to ensure a alternate transmission path when a fault occurs to deal with expansion of ring nodes is already described in conventional technology.

In this type of conventional system, it was common for the ring node that received a loopback instruction when a fault occurred to only implement a loopback on side opposite to the location where the fault occurred. Because of this, when an attempt was made to try and expand the ring nodes using the loopback function, the end result of the two ring nodes adjacent to the node expansion location operating to only implement a loopback on the side opposite to the expansion nodes was a communication interruption during the period that corresponded to the time difference of the loopback of the two ring nodes adjacent to these node expansion locations.

In the systems according to the first and second embodiments, this problem is dealt with by loopbacks occurring simultaneously in both directions on the expansion node side and the opposite side.

In the following, loopback control will be described referring to FIG. 9 to FIG. 13 for a case when ring node 10A-7 expands between ring node 10A-2 and ring node 10A-3 in ring system A (see FIG. 3) of the system according to the first embodiment.

Figure 9:
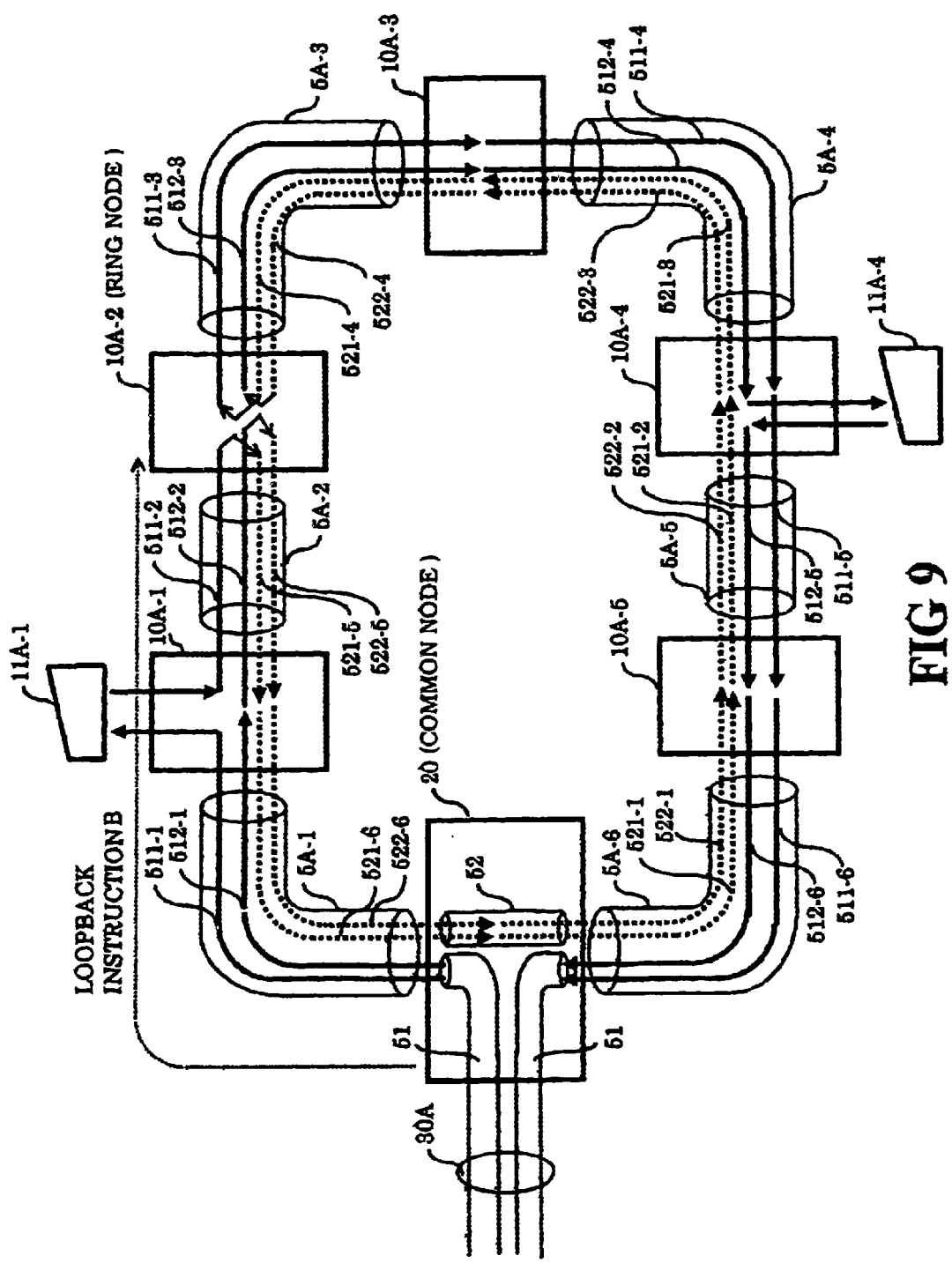
FIG. 9 shows a communication path setting condition at the initial time during a node expansion in ring system A of the first embodiment.

For this case, as shown in FIG. 9, common node 20 that bears the load to function as a control node of ring system A initially sends loopback instruction B to ring node 10A-2 from among the two ring nodes adjacent to the node expansion location.

By means of receiving this loopback instruction B, ring node 10A-2 loops back transmission paths 5A-3 and 5A-2 to the side where ring node 10A-7 will be expanded and the side opposite to that as a target.

In detail, looking at the side where ring node 10A-7 will be expanded, a loopback is carried out in order that VC path 511-3 and VC path 521-4 connect a s well as VC path 512-3 and VC path 522-4 connect. Further, looking at the side opposite to where ring node 10A-7 will be expanded, a loopback is carried out in order that VC path 511-2 and VC path 521-5 connect as well as VC path 512-2 and VC path 522-5 connect.

As understood from FIG. 9, when the loopback completes, the communication path within ring node 10A-2 displays a shape that is similar to the lowercase alphanumeric character "x". Therefore, in the following description, each ring node that carries out loopbacks for both the right and left sides of the rings in like manner to ring node 10A-2 in FIG. 9 are conveniently referred to as "x" type loopbacks.

Figure 10:
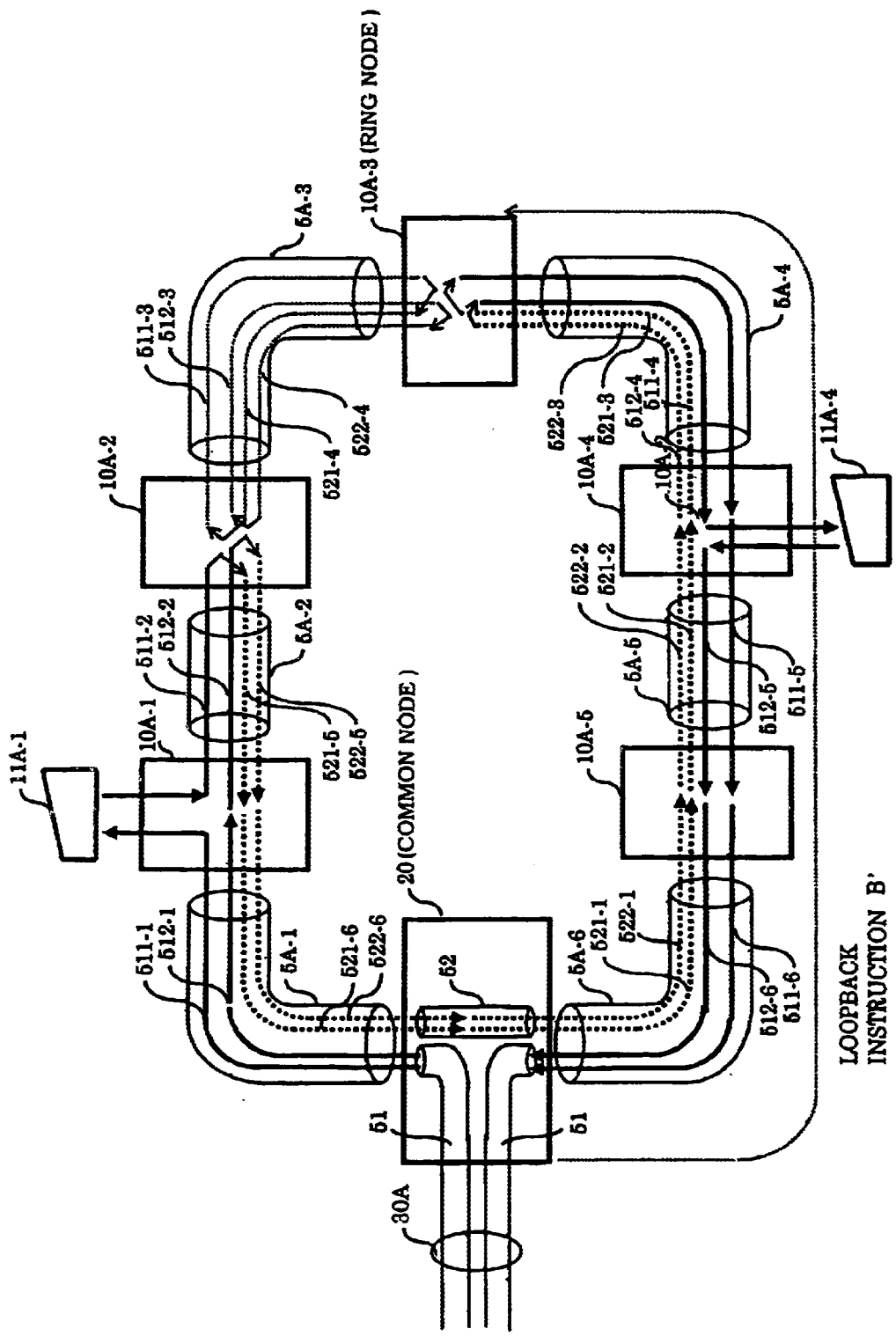
FIG. 10 shows a communication path setting condition of ring system A when continued in FIG. 9.

Next, as shown in FIG. 10, common node 20 sends loopback instruction B' through a control path to the other ring node 10A-3 adjacent to the node expansion location. By means of receiving this loopback instruction B', ring node 10A-3 carries out an "x" type loopback on ring node 10A-7 to the side where ring node 10A-7 will be expanded and the side opposite to that as a target.

In detail, looking at the side where ring node 10A-7 will be expanded, a loopback is carried out in order that VC path 511-3 and VC path 521-4 connect as well as VC path 512-3 and VC path 522-4 connect. Further, looking at the side opposite to where ring node 10A-7 will be expanded, a loopback is carried out in order that VC path 511-4 and VC path 521-3 connect as well as VC path 512-4 and VC path 522-3 connect.

In the loopback control, when, for example, ring node 10A-2 undergoes an "x" type loopback in advance (see FIG. 9), communication paths are established via VC paths 521-5, 521-6, 521-1, 521-1, 521-3, 521-4, 511-3, 511-4, 511-5, 511-6 as communication paths after VC path 511-2 of local communication terminal 11A-1 within ring system A. Because of this, communication of local communication terminal 11A-1 will not be interrupted during an "x" type loopback of ring node 10A-2.

In like manner, for local communication terminal 11A-4, communication paths are established via VC paths 522-5, 522-6, 522-1, 522-1, 522-3, 522-4, 512-3 as communication paths after VC path 512-2. Because of this, communication of local communication terminal 11A-4 will not be interrupted during a loopback of ring node 10A-2.

Thereafter, when ring node 10A-3 undergoes an "x" type loopback (see FIG. 10), VC path 521-3 is connected back to 511-4 and VC path 522-3 is connected back to 512-4 within the communication path established in FIG. 9. Because of this, communication of local communication terminal 11A-1 and local communication terminal 11A-4 will not be interrupted.

Therefore, even if there is a time difference after ring node 10A-2 undergoes an "x" type loopback in ring system A until ring node 10A-3 undergoes an "x" type loopback, communication of local communication terminal 11A-1 and local communication terminal 11A-4 will not be interrupted.

Figure 11:
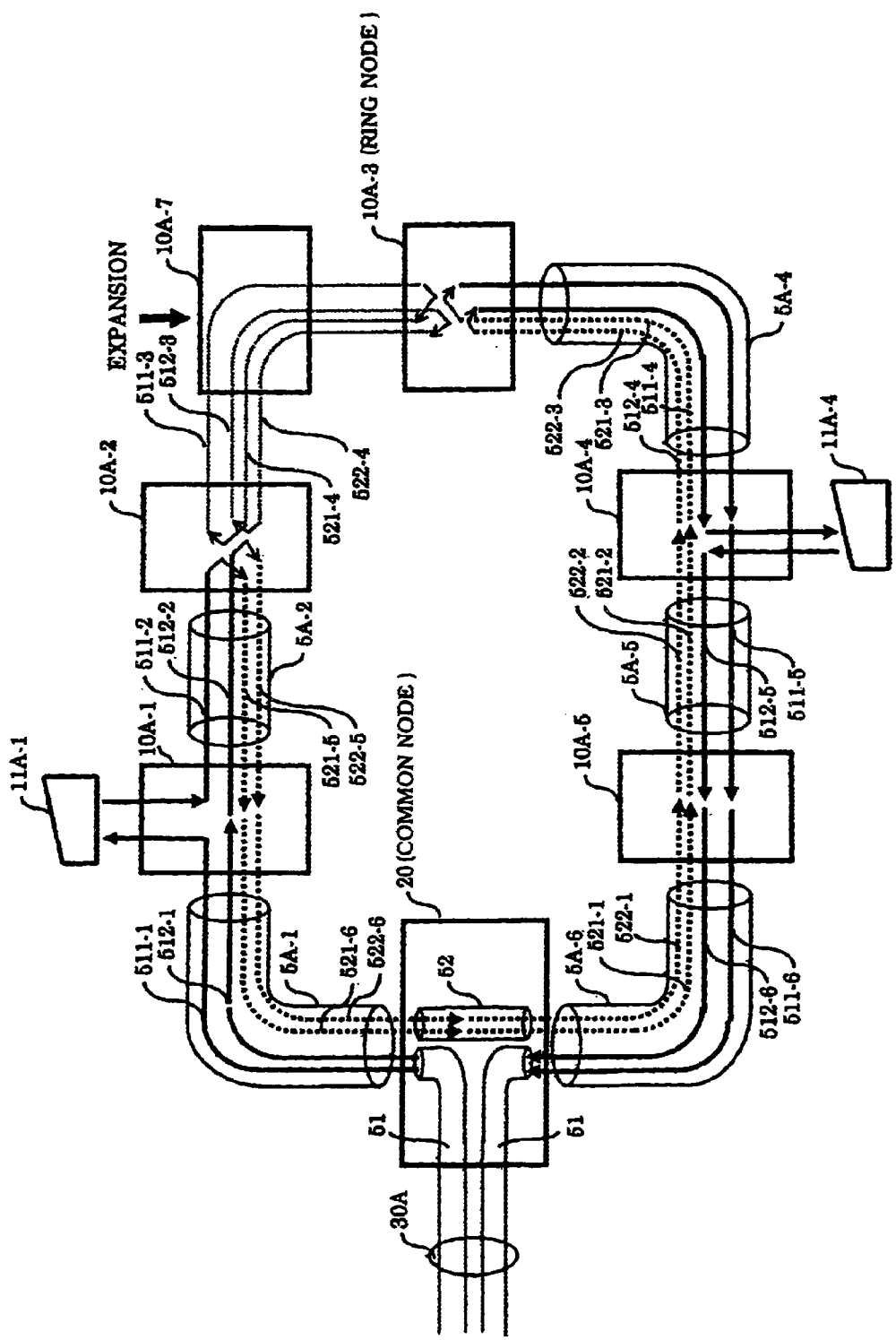
FIG. 11 shows a communication path setting condition of ring system A when continued in FIG. 10.

After both ring node 10A-2 and ring node 10A-3 complete the "x" type loopback, as shown in FIG. 11, ring node 10A-7 inserts at the node expansion location between ring node 10A-2 and ring node 10A-3 and the necessary connection processing is carried out for the connection of the ring circuits between ring node 10A-2 and ring node 10A-3.

After the connection completes, as shown in FIG. 11, the ring circuits is formed, as indicated by the dotted line in the figure, between the loopback path on the node expansion side of each of ring node 10A-2 and ring node 10A-3 during the "x" type loopback and ring node 10A-7.

Figure 12:
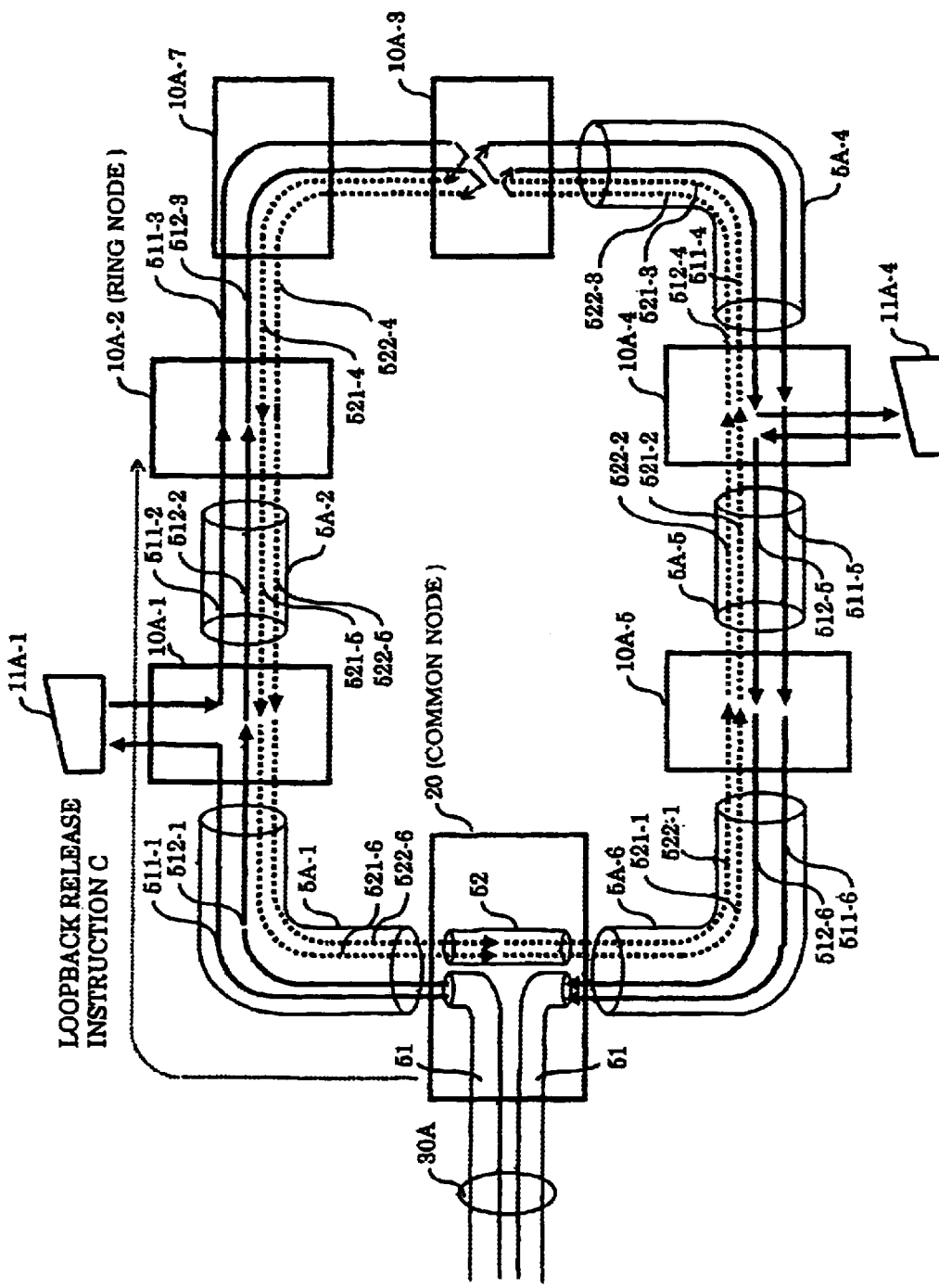
FIG. 12 shows a communication path setting condition of ring system A when continued in FIG. 11.

In this state, as shown in FIG. 12, common node 20 sends loopback release instruction C through a control path to one ring node 10A-2 adjacent to the node expansion location. By means of receiving this loopback release instruction C, ring node 10A-2 will release the "x" type loopback carried out up to now.

Figure 13:
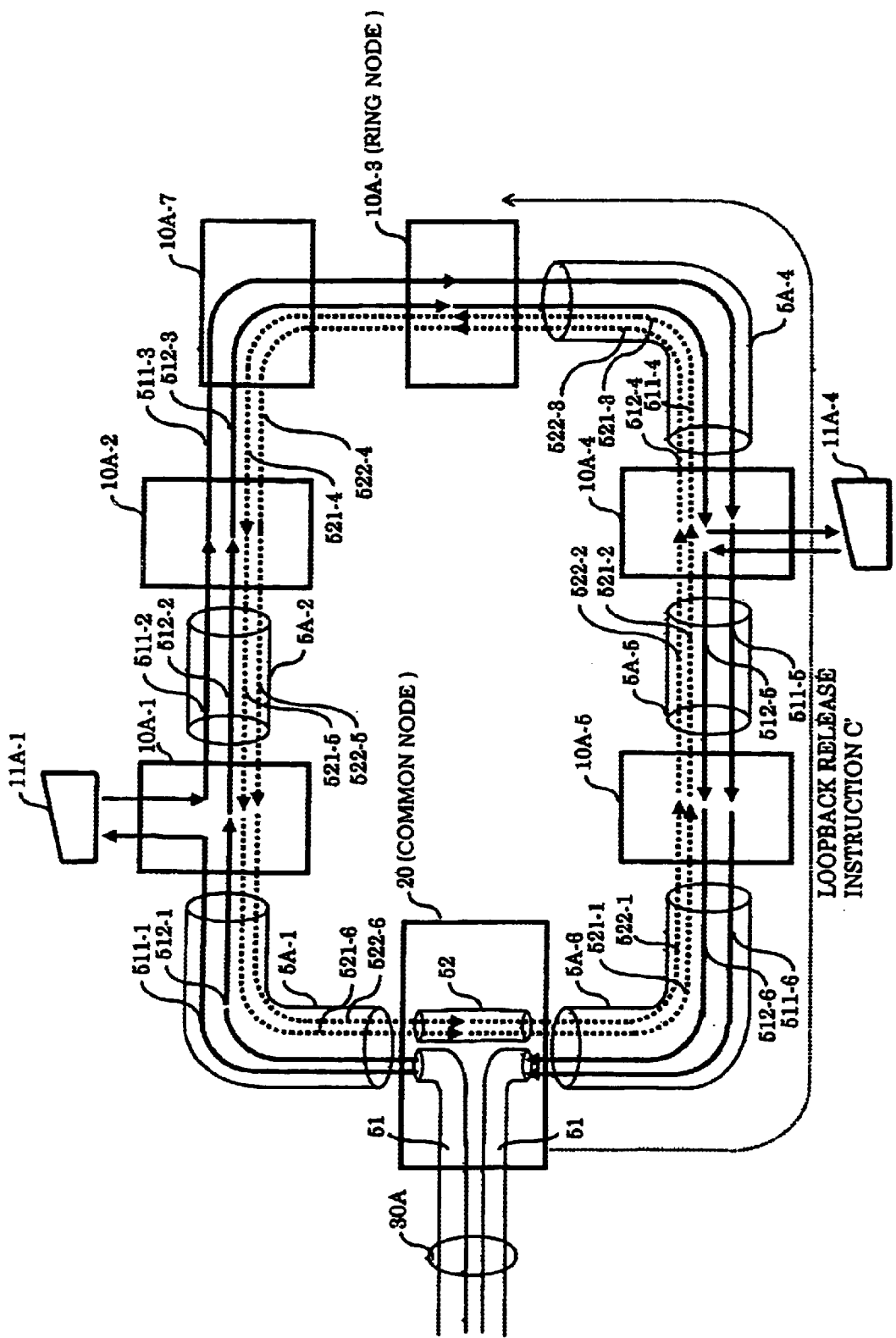
FIG. 13 shows a communication path setting condition when node expansion completes in ring system A.

Next, as shown in FIG. 13, common node 20 sends loopback release instruction C' through a control path to the other ring node 10A-3 adjacent to the node expansion location. By means of receiving this loopback release instruction C', ring node 10A-3 will release the "x" type loopback carried out up to now.

In the loopback release control, when, for example, ring node 10A-2 releases the "x" type loopback in advance (see FIG. 12), a state will be entered from the state shown in FIG. 11 in which VC path 511-3 and 521-4 are extended for the communication path after VC path 511-2 of local communication terminal 11A-1 within ring system A and in like manner, a state will be entered from the state shown in FIG. 11 in which VC path 512-3 and 522-4 are extended for the communication path after VC path 512-2 of local communication terminal 11A-4. Because of this, communication of both local communication terminals 11A-1, 11A-4 will not be interrupted.

Thereafter, when ring node 10A-3 releases the "x" type loopback (see FIG. 13), VC path 511-3 will release the return to VC path 521-4 and will be connected to VC path 511-4 within ring node 10A-3. And in addition, VC path 512-3 will release the return to VC path 522-4 and will be connected to VC path 512-4 within ring node 10A-3. Because of this, the communication path of local communication terminal 11A-1 and the communication path of local communication terminal 11A-4 will return to their normal state shown in FIG. 3 and communication of these local communication terminals 11A-1, 11A-4 will continue.

Therefore, even if there is a time difference after ring node 10A-2 releases the "x" type loopback in ring system A until ring node 10A-3 undergoes an "x" type loopback, communication of local communication terminal 11A-1 and local communication terminal 11A-4 will not be interrupted. Moreover, the "x" type loopback control is not only used when expanding ring nodes but is also very useful for preventing interruptions in communication during reductions or when restoring faults. Even further, the "x" type loopback control is not limited to systems according to the first and second embodiments which are premised on a plurality of ring systems carrying out relays and transmissions between external sources through common node 20 but can also be utilized during expansion and reduction of ring nodes in network systems obtained by a single ring system or when restoring faults.

Next, a network system comprising a single ring system that uses the loopback method will be described as a third embodiment.

Figure 14:
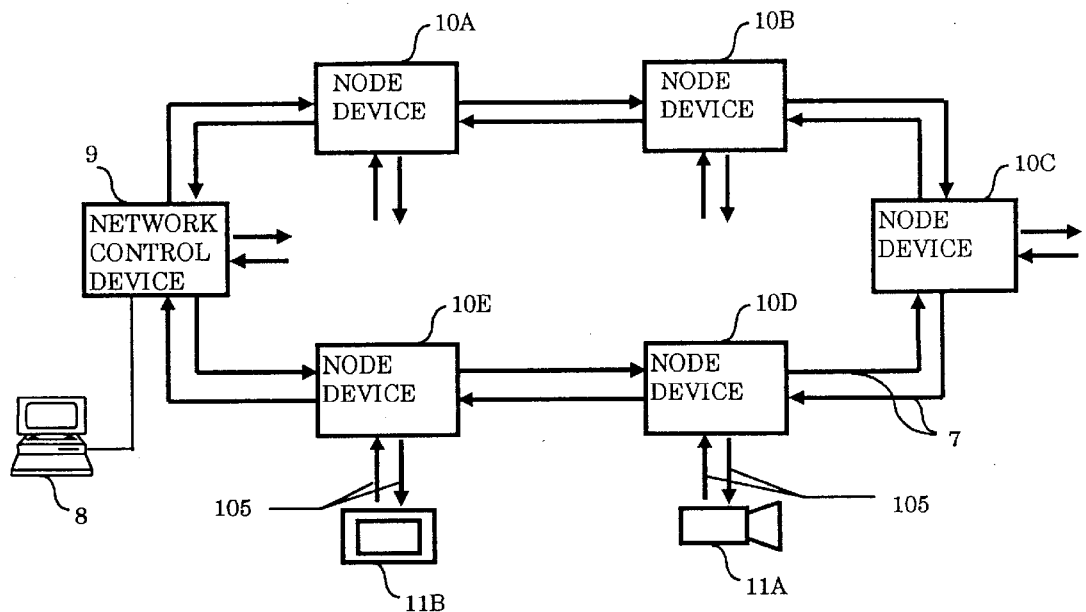
FIG. 14 shows a schematic representation of a communication network system according to a third embodiment of the present invention.

FIG. 14 shows a schematic representation of a communication network system according to a third embodiment. This system comprises connecting network control device 9 (hereinafter referred to as control node) and node devices 10A, 10B, 10C, 10D, 10E in a ring shape through transmission path 7 that uses, for example, optical fiber.

Either one or a plurality of local communication terminals are connected to control node 9 and ring nodes 10A, 10B, 10C, 10D, 10E through I/O port 105. Only camera 11A (connected to ring node 10D) and monitor device 11B (connected to ring node E) are shown in this figure as a local communication terminal.

For example, an ATM switching device is used as these node devices 10A, 10B, 10C, 10D, 10E. In other words, these node devices 10 is located within an ATM switching network obtained by means of two levels of networks which are called a VP and VC and has a function that carries out switch processing of fixed length cells (ATM cell) which are input from an input port in accordance with a VPI and a VCI which are contained within the ATM cell.

Control node 9 controls each ring node within the ring and in addition to an ATM switching function identical to these ring node 10 is also provided with the following types of functions. A formation function for communication paths and control paths between each ring node 10. A communication function between reach ring node 10 or between the local communication terminals 11 (11A, 11B, . . . ) that uses a communication path. A communication path loopback control function used during expansion or reduction of ring node 10 (described later) or when a fault occurs.

Even further, a management terminal 8 is connected to control node 9. This management terminal 8 manages the man-machine interface function. In addition, management terminal 8 issues instructions necessary to execute each of the types of control functions. Moreover, although FIG. 4 discloses a configuration, wherein management terminal 8 is directly connected to control node 9, the configuration is not limited to this and, for example, the configuration can be such that management terminal 8 is connected to control node 9 through a specified communication network.

Control node 9 executes the types of control functions based on instructions from management terminal 8. For instance, when communication are carried out between local communication terminal 11 connected to each ring node 10, control node 9 sets a virtual communication path (communication path 71A described later) within transmission path 7 between each ring node 10 that controls each of these local communication terminals 11 and then using this communication path controls communication between the transmission origin local communication terminal 11 and transmission destination local communication terminal 11. Moreover, control such as path settings of ring nodes 10 is carried out using a control path. In other words, there are two types of control paths and communication paths in this communication network system which function as virtual paths which can be formed within transmission path 7.

The communication paths are in a clockwise direction of the rings (direction of node devices 10A, 10B, 10C, 10D, 10E) and in a counterclockwise direction opposite to this communication between local communication terminals 11 are achieved by means of a bidirectional communication which use a clockwise communication path in a normal state. Furthermore, the counterclockwise communication path is achieved in a mode reserved for use in a loopback for a circuit fault.

Figure 15:
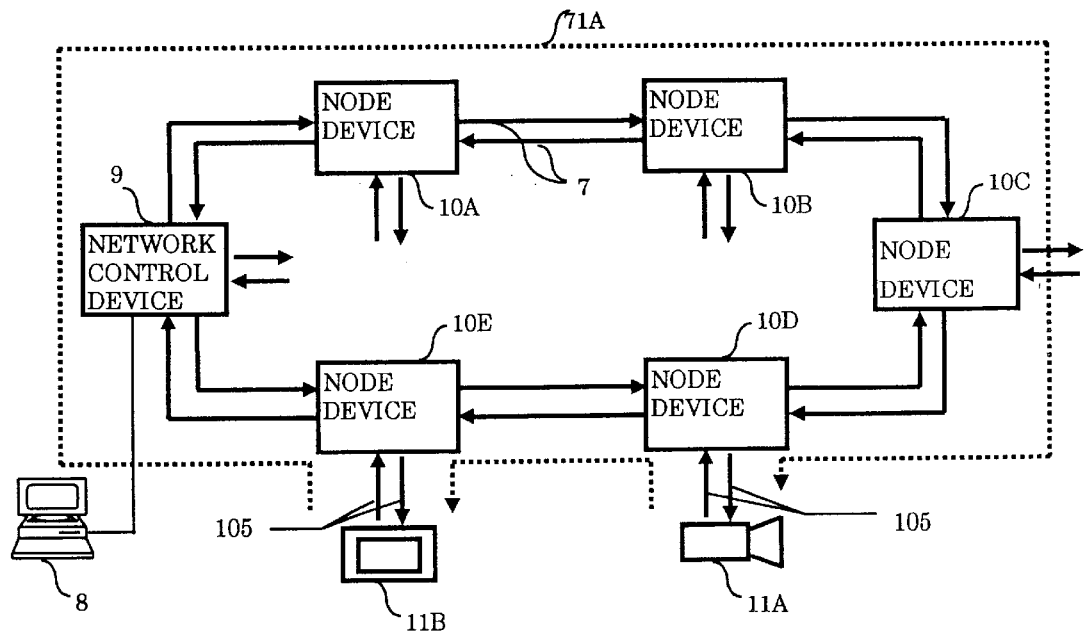
FIG. 15 describes the communication operation between local communication terminals in the third embodiment.

Description will be provided referring to FIG. 15 concerning communication between camera 11A (connected to ring node 10D) and monitor device 11B (connected to ring node 10E). For this case, communication path 71A that is clockwise in the direction of monitor device 11B from camera 11A is formed within transmission path 7 by means of the control. Further, although not shown in the figure, counterclockwise communication path 71B is also formed within transmission path 7 and is reserves for use in a loopback. After communication path settings, the moving screen data obtained by means of photography of camera 11A is input from I/O port 105 of ring node 10D and then after being switched in the direction of ring node 10E by the ATM switching portion of ring node 10D, is sent to ring node 10E through communication path 71A, is switched and output to I/O port 105 by the ATM switching portion within ring node 10E, is transmitted to monitor device 11B and then is reproduced and output.

Furthermore, data of the control data of camera 11A output from monitor device 11B is input from I/O port 105 of ring node 10E and then after being switched and output in the direction of control node 9 by the ATM switching portion of ring node 10E, is sent to ring node 10D via control node 9, ring nodes 10A, 10B, 10C through communication path 71A, is switched and output to I/O port 105 by the ATM switching portion within ring node 10D and then is transmitted to camera 11A.

Figure 16:
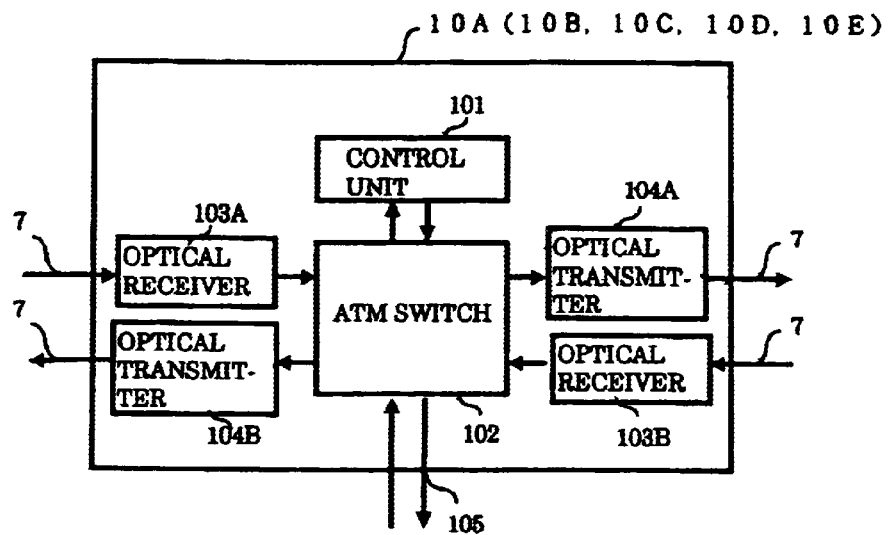
FIG. 16 shows a schematic representation of a node device in the third embodiment.

The operations of control node 9 and each ring node 10 (10A, 10B, 10C, 10D, 10E) during communication between camera 11A and monitor device 11B will be described in more detail referring to FIG. 16. FIG. 16 shows a schematic representation of a node device 10 that constructs this communication network system and comprises control portion 101, ATM switching portion 102, optical receiver portions 103A, 103B, optical transmission portions 104A, 104B and I/O port 105.

Except for being provided with an interface function between management terminal 8, the fundamental configuration of control node 9 is also identical to each of the ring nodes 10.

In FIG. 16, optical receiver portions 103A, 103B and optical transmission portions 104A, 104B are connected to transmission path 7. In this communication network system, there are two transmission paths 7, one being clockwise and the other being counterclockwise (see FIG. 14 and FIG. 15). Optical receiver portion 103A and optical transmission portion 104A are used for communication that uses, for example, a clockwise transmission path and optical receiver portion 103B and optical transmission portion 104B are used for communication that uses a counterclockwise transmission path. Local communication terminals such as the camera 11A and monitor device 11B are connected to I/O port 105.

In this ring node 10, for example, data input from optical receiver portion 103A is transmitted to any one of control portion 101, I/O port 105, or optical transmission portions 104A, 104B by means of the switching process in ATM switching portion 102. In like manner, data input from optical receiver portion 103B is transmitted to any one of control portion 101, I/O port 105, or optical transmission portions 104A, 104B by means of the switching process in ATM switching portion 102. Even further, data input from control portion 101 or I/O port 105 is transmitted to any one of I/O port 105, optical transmission portions 104A, 104B or control portion 101, optical transmission portions 104A, 104B by means of the switching process in ATM switching portion 102.

By means of this switching function, in ring node 10D in the communication state shown in FIG. 15 for example, a switching process occurs in which the moving screen data of camera 11A input from I/O port 105 transmits to optical transmission portion 104B using ATM switching portion 102 and even further, the control data from monitor device 11B input from optical receiver portion 103B outputs to camera 11A from I/O port 105 using ATM switching portion 102.

Moreover, in ring node 10E in the communication state shown in FIG. 15, a switching process occurs in which the moving screen data of camera 11A input from optical receiver portion 103B outputs to monitor device 11B from I/O port 105 using ATM switching portion 102 and even further, the control data from monitor device 11B input from monitor device 11B transmits to optical transmission portion 104B using ATM switching portion 102.

In order to transmit input data (such as the moving screen data or control data) in a specified path direction (for example, direction of ring node 10E containing monitor device 11B or direction of ring node 10D containing camera 11A) in ATM switching portion 102, a method can be used, wherein a path direction is, for example, set beforehand that corresponds to an address, that is additional necessary data of a cell (units of data), in a communication path setting table (not shown in figure) provided within control portion 101. Every time a cell arrives in control portion 101, the path direction that corresponds to the address within the communication path setting table is searched based on the address within the cell and the switching action of ATM switching portion 102 is controlled in order to form the path direction.

In each ring node 10 that has the functional configuration shown in FIG. 16, for example, a loopback of the transmission path (communication path) is carried out by controlling the switching action of ATM switching portion 102 in order to output the input data from optical receiver portion 103A to optical transmission portion 104B through ATM switching portion 102. In like manner, a loopback of the transmission path (communication path) is carried out by controlling the switching action of ATM switching portion 102 in order to output the input data from optical receiver portion 103B to optical transmission portion 104A through ATM switching portion 102.

When expanding new ring nodes in a ring, when reducing already existing ring nodes from a ring, or when forming an alternate communication path when a fault occurs in the communication network system according to the third embodiment, a loopback is carried out for the communication paths on both the left and right sides of the ring using the type of loopback function of ATM switching portion 102.

In the following, loopback control when expanding or reducing ring nodes or when a fault occurs in the communication network system according to this embodiment will be described. Further, the description will be presuming that a loopback request or loopback release request together with the name of the request target node device from management terminal 8 (connected to control node 9) are instructed to control node 9 and then control node 9 issues a loopback instruction or loopback release instruction (described later) to each of the applicable ring nodes 10A, 10B, 10C, 10D, 10E within a ring based on the instructions from management terminal 8 during the loopback control in this embodiment.

At first, loopback control when expanding ring node 10F between ring node 10A and ring node 10B in this network communication system will be described referring to FIG. 17 to FIG. 23.

Figure 17:
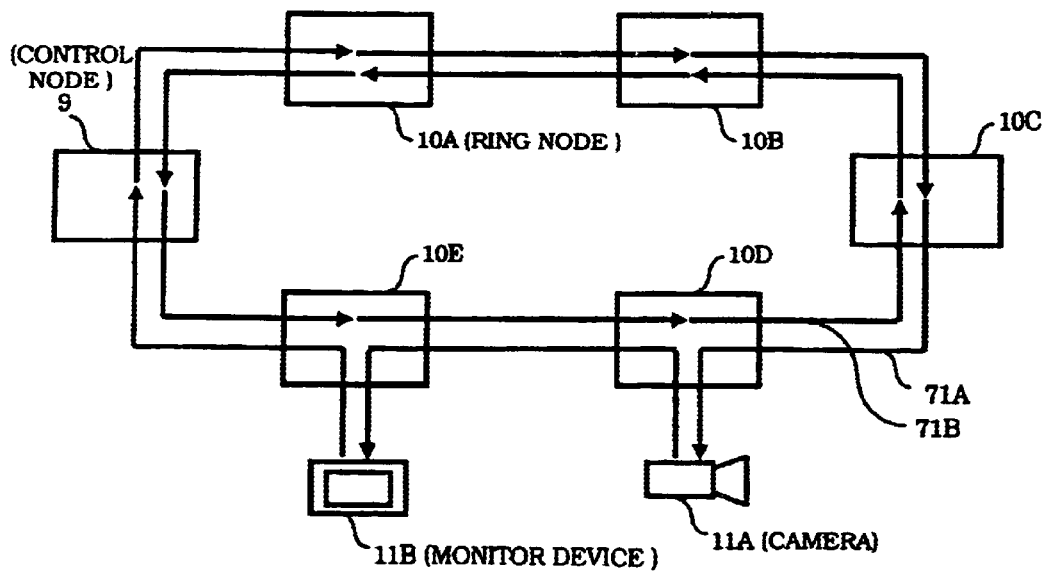
FIG. 17 shows a communication path setting condition before node expansion in the third embodiment.

FIG. 17 shows a setting state of a communication path when carrying out communication between camera 11A (connected to ring node 10D) and monitor device 11B (connected to ring node 10E) (see FIG. 15) as a communication path setting example of before beginning node expansion. As shown in this figure, clockwise communication path 71A and counterclockwise communication path 71B are set along the ring between both camera 11A and monitor device 11B during communication between them. Clockwise communication path 71A is used during normal communication between camera 11A and monitor device 11B and counterclockwise communication path 71B is not used during normal communication but is a reserve communication path used when carrying out a loopback.

In FIG. 17, when expanding ring node 10F between ring node 10A and ring node 10B during communication between camera 11A and monitor device 11B using clockwise communication path 71A, the order of the control of loopback and loopback release change as shown in FIG. 18 to FIG. 23.

Figure 18:
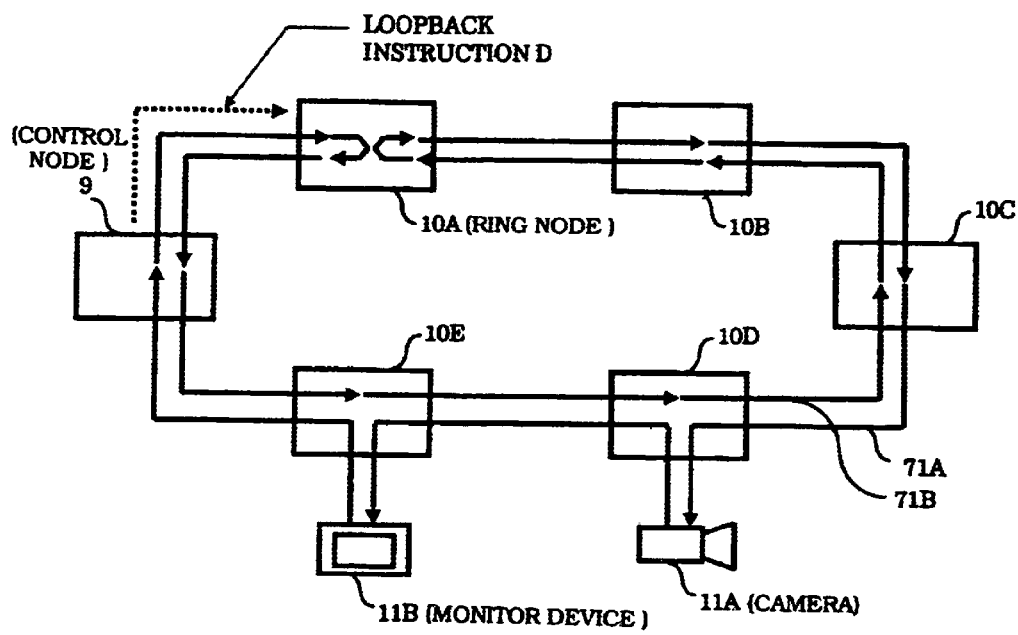
FIG. 18 shows a communication path setting condition at the initial time during a node expansion.

To start, in FIG. 18, control node 9 sends loopback instruction D through a control path to one ring node 10A from among two ring nodes adjacent to the node expansion location based on specified instructions transferred from management terminal 8 by the occurrence of the node expansion request. By means of receiving this loopback instruction D, ring node 10A implements a loopback on the control node 9 side along with implementing a loopback for the node expansion side as well.

As was stated in the description of loopback control in the system of the first embodiment, when the loopback completes (see FIG. 18), the communication path within ring node 10A displays a shape that is similar to the lowercase alphanumeric character "x". Therefore, in the following description, each ring node 10A, 10B, 10C, 10D, 10E that carries out loopbacks for both the right and left sides of the rings in like manner to ring node 10A in FIG. 18 are conveniently referred to as "x" type loopbacks.

Figure 19:
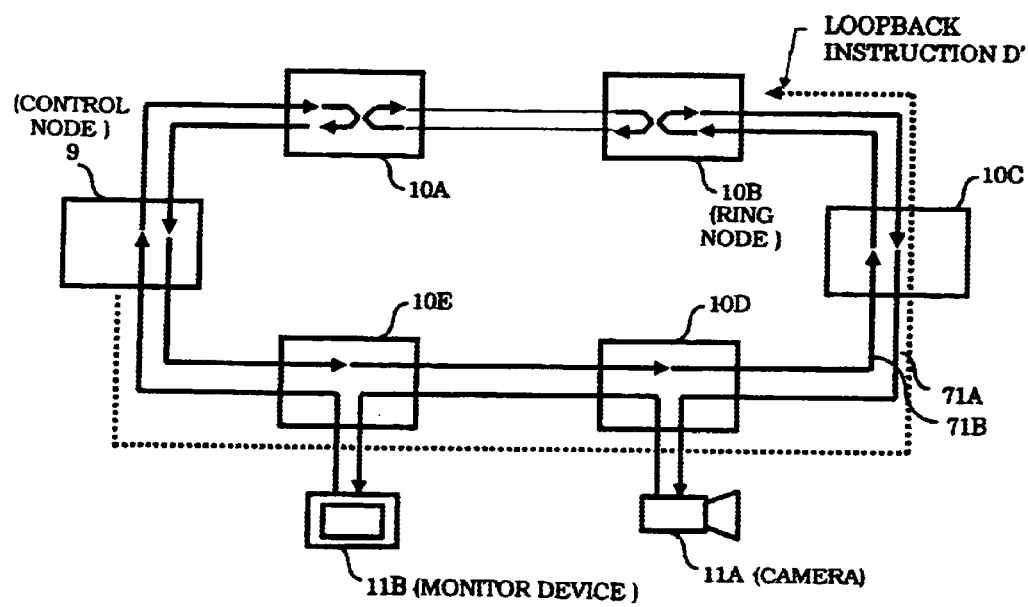
FIG. 19 shows a communication path setting condition when continued in FIG. 18.

Next, as shown in FIG. 19, control node 9 sends loopback instruction D' through a control path to the other ring node 10B adjacent to the node expansion location. By means of receiving this loopback instruction D', ring node 10B carries out an "x" type loopback on both the control node 9 side and the node expansion side in like manner to ring node 10A of this figure. In this way, in this embodiment the two ring nodes adjacent to the node expansion location both carry out an "x" type loopback based on the loopback instructions from control node 9.

In the loopback control above, when, for example, ring node 10A carries out the "x" type loopback in advance (see FIG. 18), clockwise communication path 71A is returned to counterclockwise communication path 71B between ring node 10A and control node 9 simultaneous with the returned counterclockwise communication path 71B being returned to clockwise communication path 71A between ring node 10A and ring node 10B on the node expansion side. As a result, the communication path between camera 11A and monitor device 11B is not interrupted during the loopback of ring node 10A.

In like manner, when ring node 10B carries out the "x" type loopback, the communication path between camera 11A and monitor device 11B is not interrupted as well. In other words, in this embodiment, when a time difference occurs in the "x" type loopback between ring node 10A and ring node 10B, the communication path between camera 11A and monitor device 11B can always be ensured making it possible to maintain communication between camera 11A and monitor device 11B through that communication path.

Figure 20:
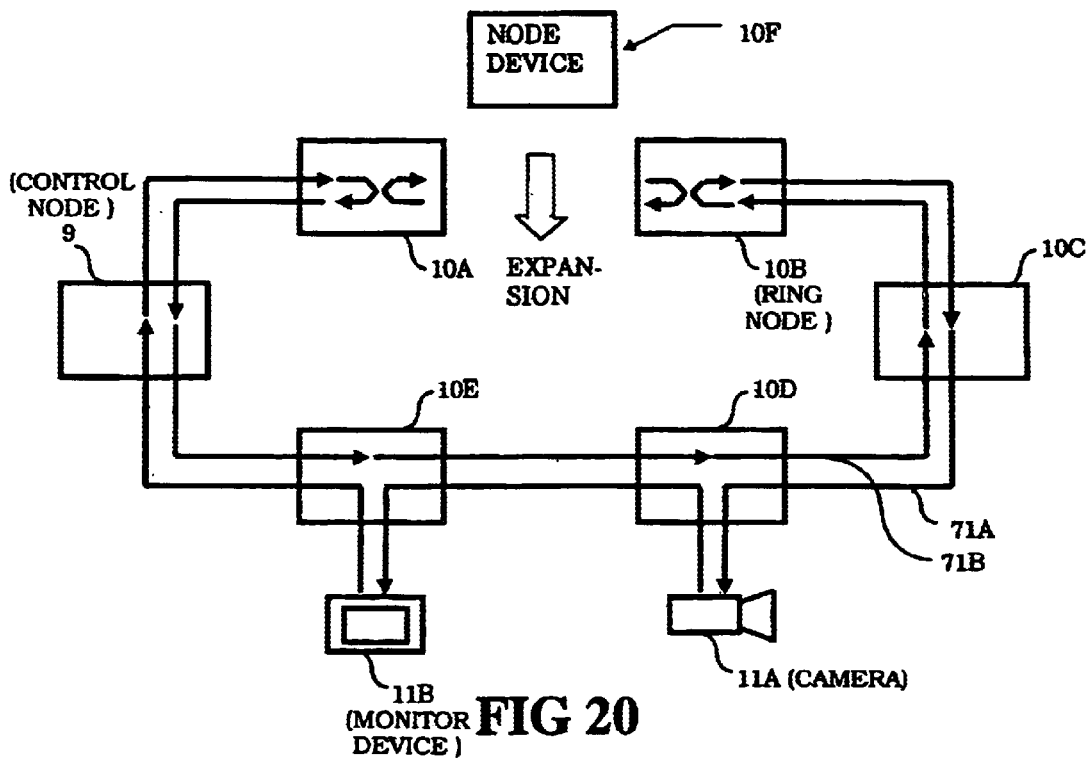
FIG. 20 shows a communication path setting condition when continued in FIG. 19.

After both ring node 10A and ring node 10B complete the "x" type loopback, as shown in FIG. 20, ring node 10F inserts at the node expansion location between ring node 10A and ring node 10B and the necessary connection processing is carried out for the connection of the ring circuits between ring node 10A and ring node 10B.

Figure 21:
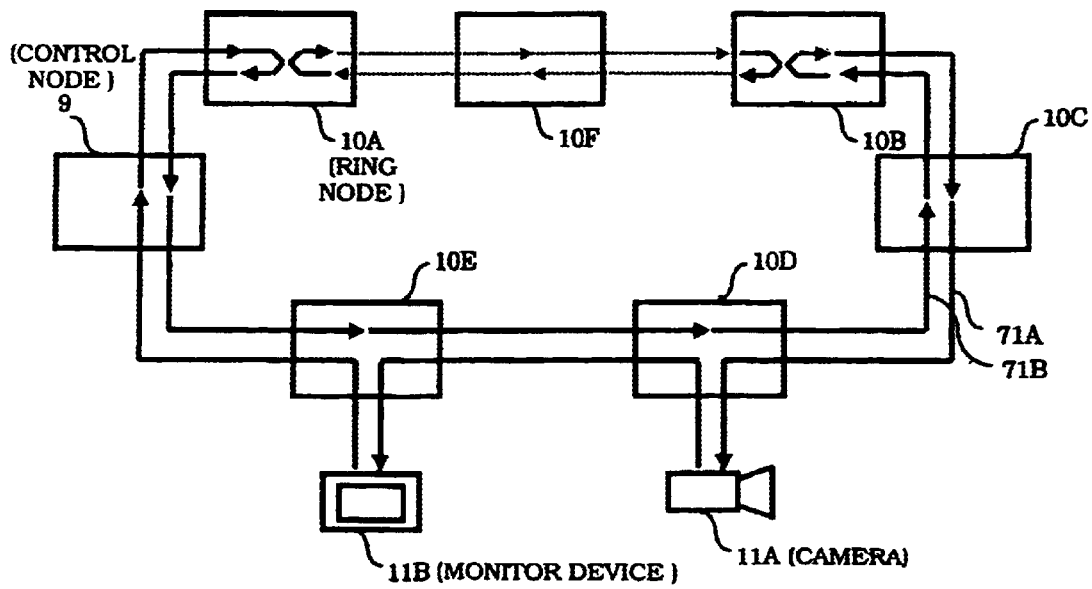
FIG. 21 shows a communication path setting condition when continued in FIG. 20.
Figure 22:
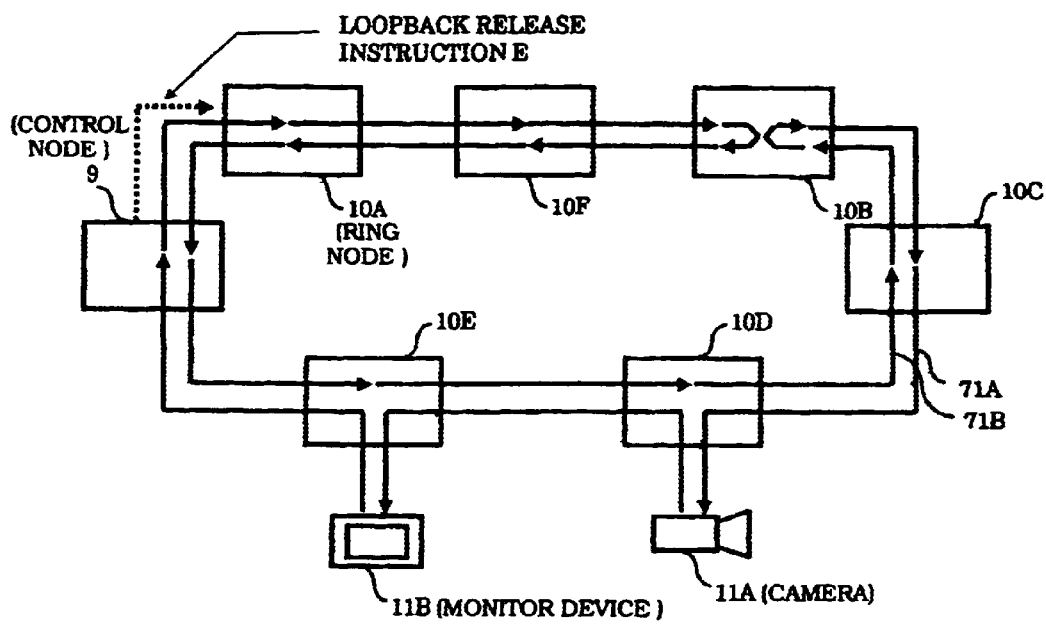
FIG. 22 shows a communication path setting condition when continued in FIG. 21.

After the connection completes, as shown in FIG. 21, the ring circuits is formed, as indicated by the dotted line in the figure, between the loopback path on the node expansion side of ring node 10A and ring node 10B during the "x" type loopback and ring node 10E. In this state, as shown in FIG. 22, control node 9 sends loopback release instruction E through a control path to one ring node 10A adjacent to the node expansion location. By means of receiving this loopback release instruction E, ring node 10A will release the "x" type loopback carried out up to now.

Figure 23:
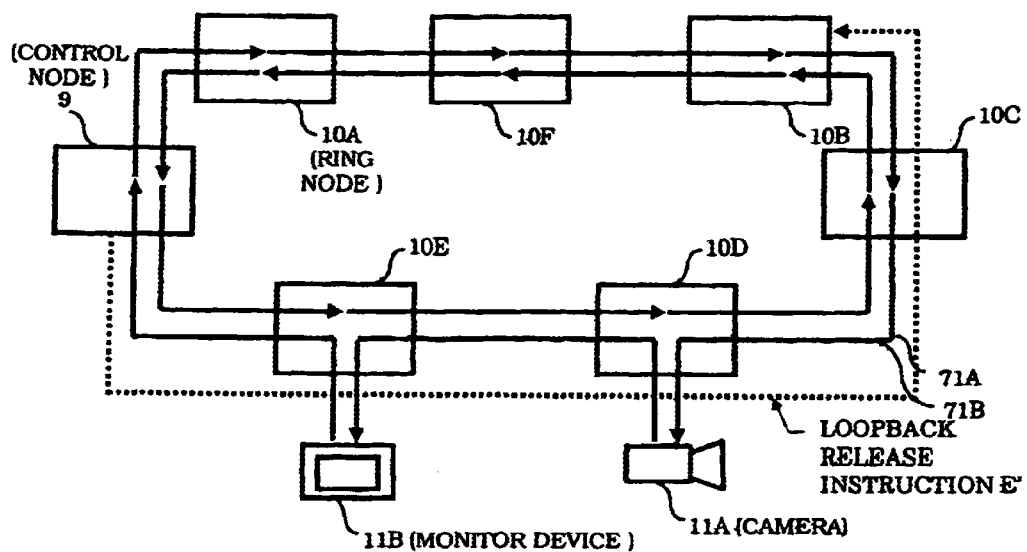
FIG. 23 shows a communication path setting condition when node expansion completes.

Next, as shown in FIG. 23, control node 9 sends loopback release instruction E' through a control path to the other ring node 10B adjacent to the node expansion location. By means of receiving this loopback release instruction E', ring node 10B will release the "x" type loopback carried out up to now. In the loopback release control, when, for example, ring node 10A releases the "x" type loopback in advance (see FIG. 22), the return between clockwise communication path 71A and counterclockwise communication path 71B between ring node 10A and control node 9 will be released simultaneous with clockwise communication path 71A that was released from the return extending to within ring node 10B from ring node 10A through expansion node 10F and then being returned to counterclockwise communication path 71B on that expansion side loopback path. As a result, communication between camera 11A and monitor device 11B will not be interrupted during the "x" type loopback release of ring node 10A.

In like manner, when ring node 10B carries out the "x" type loopback release, the communication path between camera 11A and monitor device 11B is not interrupted as well. Because of this, in this embodiment, if a time difference occurs in the "x" type loopback between ring node 10A and ring node 10B when expanding ring node 10F between ring node 10A and ring node 10B, communication between camera 11A and monitor device 11B will not be interrupted making it possible to ensure the communication path as well as to maintain communication between camera 11A and monitor device 11B through that communication path.

Figure 24:
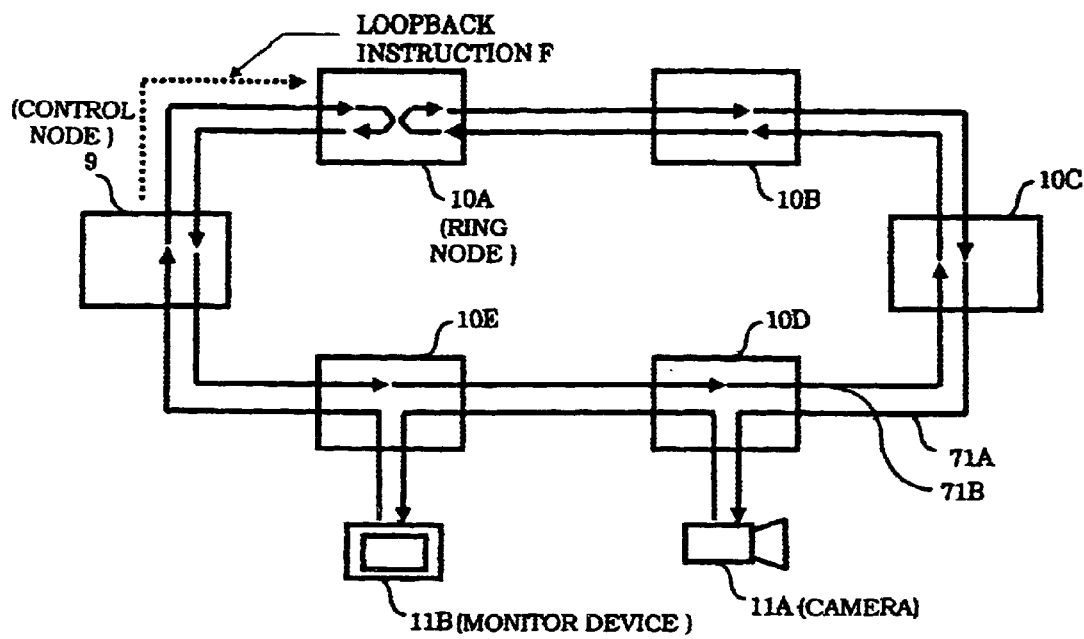
FIG. 24 shows a communication path setting condition at the initial time during a node reduction.

Next, loopback control operation will be described when reducing nodes in the communication network system according to the third embodiment referring to FIG. 24 to FIG. 28. In FIG. 24, when reducing ring node 10B in a state in which camera 11A and monitor device 11B are normally communicating by means of communication path 71A, the control of loopback and loopback release change in order as shown in FIG. 25 to FIG. 28.

To start, in FIG. 24, control node 9 sends loopback instruction F through a control path to one ring node 10A from among two ring nodes adjacent to the node reduction location based on specified instructions transferred from management terminal 8 by the occurrence of the node reduction request. By means of receiving this loopback instruction F, ring node 10A implements an "x" type loopback on the control node 9 side along with implementing a loopback for the node reduction side as well.

Figure 25:
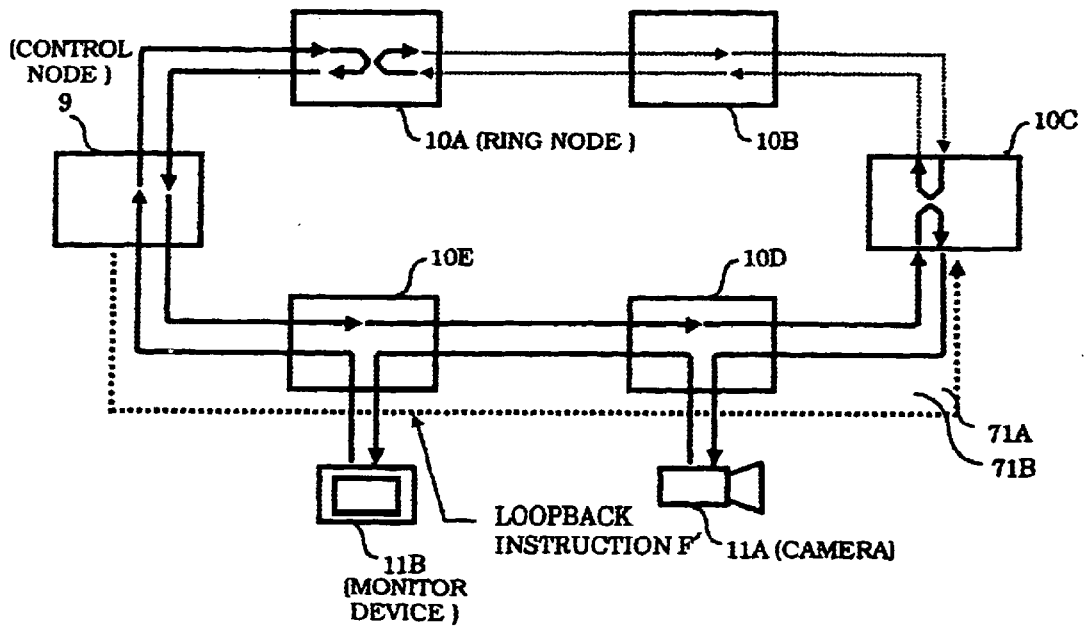
FIG. 25 shows a communication path setting condition when continued in FIG. 24.

Next, as shown in FIG. 25, control node 9 sends loopback instruction F' through a control path to the other ring node 10C adjacent to the node reduction location. By means of receiving this loopback instruction f', ring node 10C carries out an "x" type loopback on both the control node 9 side and the node reduction side as shown in this figure.

According to the loopback control, it is possible to prevent communication between camera 11A and monitor device 11B from being stopped due to the reasons identical to the case described above referring to FIG. 18 and FIG. 19.

Figure 26:
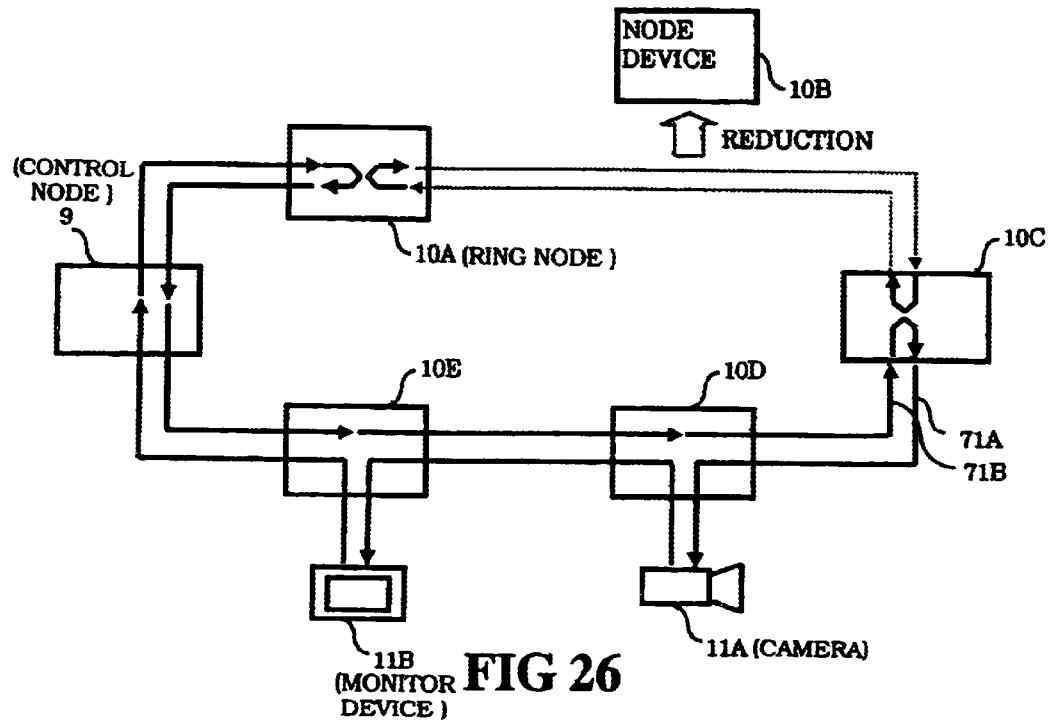
FIG. 26 shows a communication path setting condition when continued in FIG. 25.

After both ring node 10A and ring node 10C complete the "x" type loopback, as shown in FIG. 26, ring node 10B disposed between ring node 10A and ring node 10C removes 10B and the necessary connection processing is carried out for the connection of the ring circuits (indicated by dotted line) between ring node 10A and ring node 10C.

Figure 27:
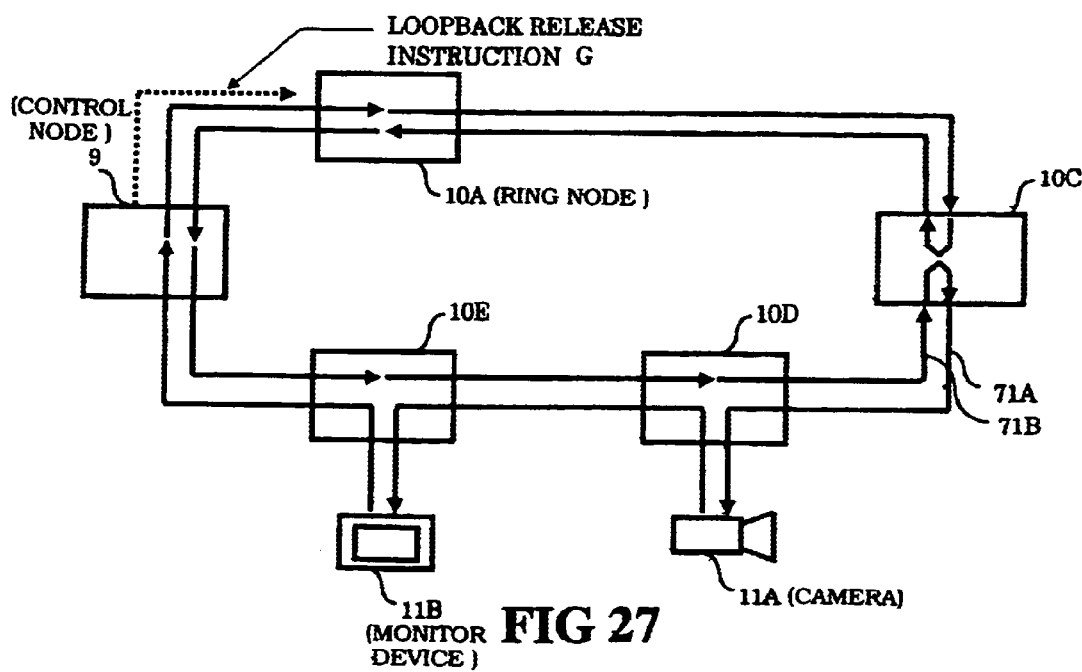
FIG. 27 shows a communication path setting condition when continued in FIG. 26.

After the connection completes, as shown in FIG. 27, control node 9 sends loopback release instruction G through a control path to one ring node 10A adjacent to the node reduction location. By means of receiving this loopback release instruction G, ring node 10A will release the "x" type loopback carried out up to now.

Figure 28:
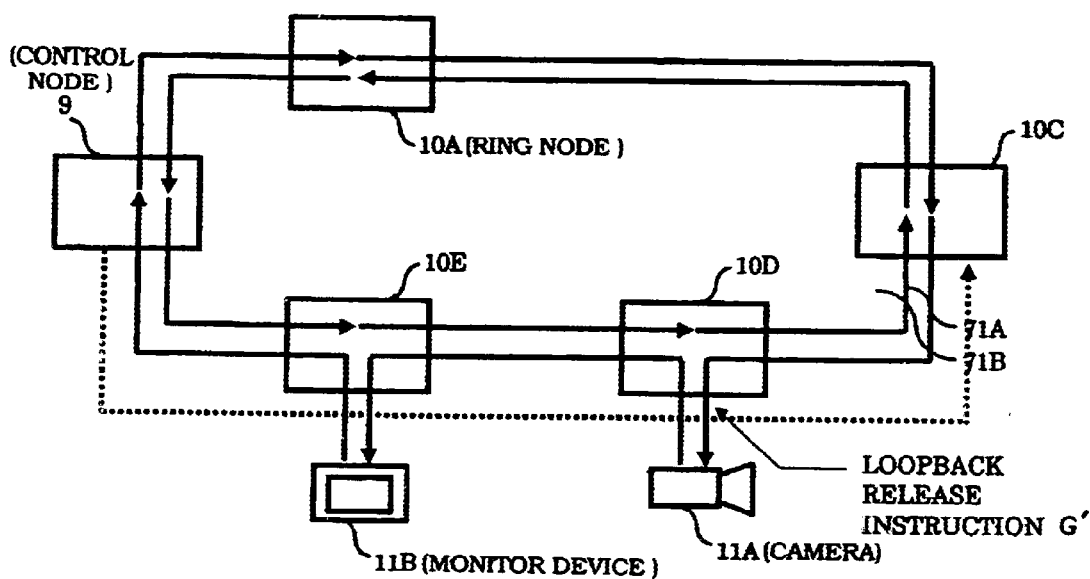
FIG. 28 shows a communication path setting condition when node reduction completes.

Next, as shown in FIG. 28, control node 9 sends loopback release instruction G' through a control path to another ring node 10C adjacent to the node reduction location. By means of receiving this loopback release instruction G', ring node 10C will release the "x" type loopback carried out up to now. According to the loopback control, when reducing ring node 10B from a ring, it is possible to prevent communication between camera 11A and monitor device 11B from being stopped due to the reasons identical to the case described above referring to FIG. 22 and FIG. 23.

Next, loopback control operation will be described when restoring a node fault in the communication network system according to this embodiment referring to FIG. 29 to FIG. 31. In this system an example will be described, wherein a fault occurs in ring node 10B in a state (see FIG. 17) in which camera 11A and monitor device 11B are communicating by means of communication path 71A and thereafter the fault of ring node 10B is restored.

Moreover, for this case, after a fault occurs in ring node B, control node 9 transfers a loopback request to two ring nodes 10A and 10C adjacent to ring node 10B. By means of this loopback instruction, an "x" type loopback is carried out for each of these ring nodes 10A and 10C.

Because of this, an alternate communication path for ring node 10B where the fault occurred is formed between both camera 11A and monitor device 11B maintaining communication between both the camera and monitor device. Hereafter, a fault restoration operation is carried out for ring node 10B where the fault occurred and then after completing the fault restoration operation, the necessary connection processing is carried out for the ring circuits between ring node 10A adjacent to ring node 10B and ring node 10C.

Figure 29:
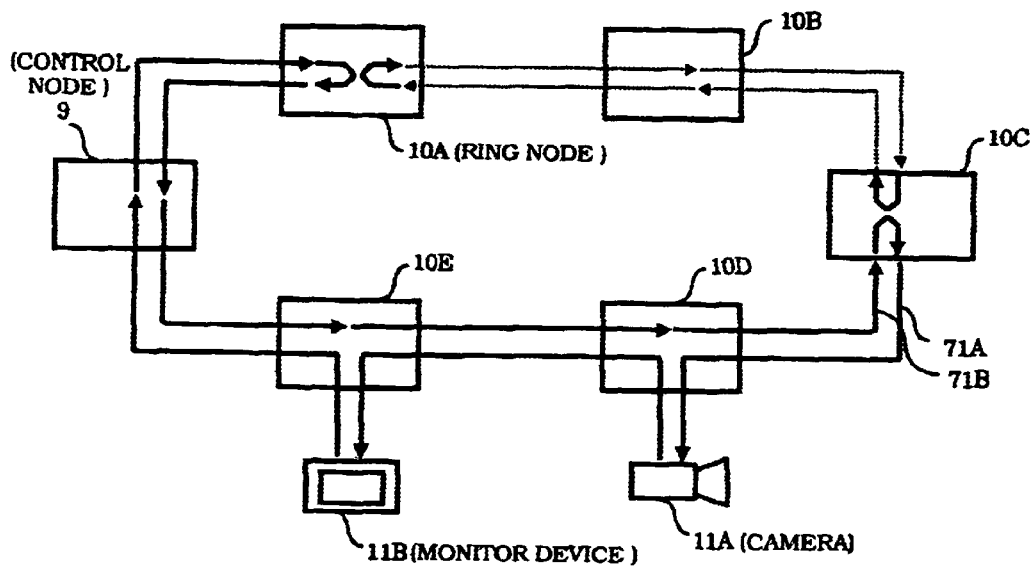
FIG. 29 shows a communication path setting condition at the initial time during a fault restoration.

FIG. 29 shows a communication path setting condition when the power supply of ring node 10B where the fault was restored is turned ON after completing the necessary processing. As understood from this figure, a communication path is formed at this time, as shown by the dotted lines in the figure, between the loopback path on the ring node 10B side of ring node 10A and ring node 10C during the "x" type loopback and ring node 10B.

Figure 30:
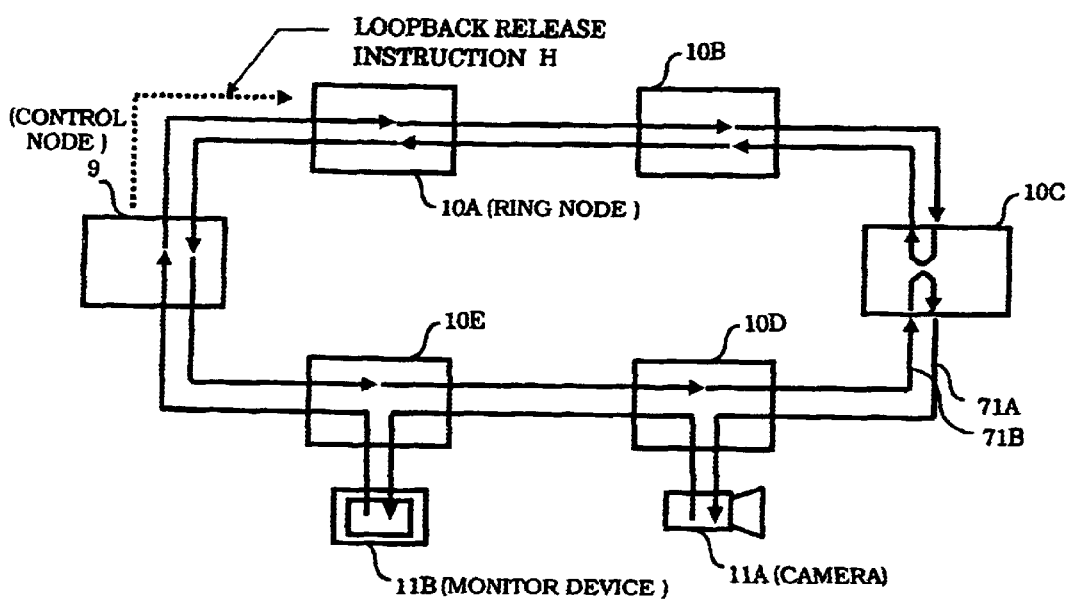
FIG. 30 shows a communication path setting condition when continued in FIG. 29.

In this state, as shown in FIG. 30, control node 9 sends loopback release instruction H through a control path to one ring node 10A adjacent ring node 10B. By means of receiving this loopback release instruction H, ring node 10A will release the "x" type loopback carried out up to now.

Figure 31:
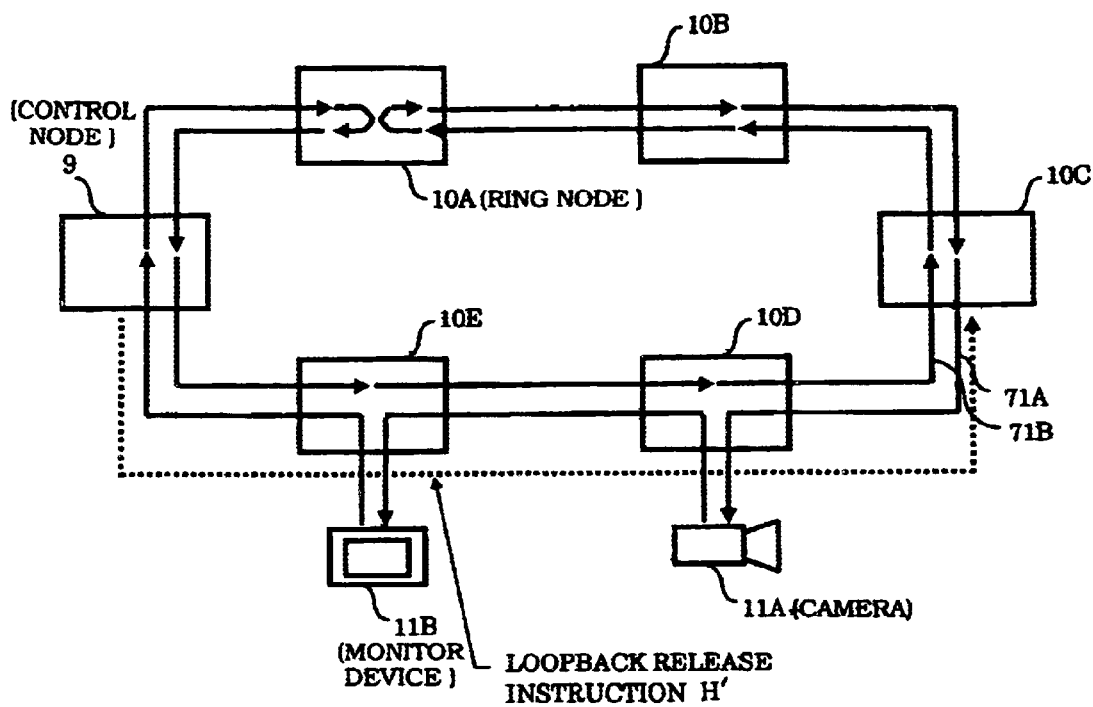
FIG. 31 shows a communication path setting condition when fault restoration completes.

Next, as shown in FIG. 31, control node 9 sends loopback release instruction H' through a control path to the other ring node 10C adjacent to ring node 10B. By means of receiving this loopback release instruction H', ring node 10C will release the "x" type loopback carried out up to now. In the loopback release control, when, for example, ring node 10A releases the "x" type loopback in advance (see FIG. 30), the return between clockwise communication path 71A and counterclockwise communication path 71B between ring node 10A and control node 9 will be released simultaneous with clockwise communication path 71A that was released from the return extending to within ring node 10C from ring node 10A through ring node 10B where the fault was restored and then being returned to counterclockwise communication path 71B on ring node 10B side loopback path. As a result, communication between camera 11A and monitor device 11B will not be interrupted during the "x" type loopback release of ring node 10A.

Thereafter, when ring node 10C is released from the "x" type loopback (see FIG. 31), clockwise communication path 71A and counterclockwise communication path 71B will both be connected to each other within ring node 10C restoring the original ring communication circuit.

The above operation is identical to a case when ring node 10C is released from the "x" type loopback in advance from ring node 10A. Because of this, if a time difference occurs in the loopback release between ring node 10A and ring node 10C adjacent to ring node 10B when restoring a fault of ring node 10B in this embodiment as well, the communication path can be ensured without interrupting the communication between camera 11A and monitor device 11B making it possible to maintain communication between camera 11A and monitor device 11B through that communication path.

The present invention is not limited to each of the embodiments and can be modified or applied in various ways.

For example, in each of the embodiments, although a description was provided on control of a loopback and loopback release done manually by means of instructions from a management terminal, this can be achieved automatically.

Furthermore, in each of the embodiments, although ring circuits within ring systems are formed by means of a wired circuit using, for example, optical fiber, the ring circuits can also be formed by means of radio circuits.

What is claimed is:

1. A communication network system, wherein a plurality of node devices and a control node device that controls said plurality of node devices are connected in a ring shape by means of ring circuits that can set a first communication path and a second communication path in a direction opposite to that of the first communication path and that during normal operation carries out transmission of data through the first communication path between each of the node devices or between communication terminals connected to each of the node devices, wherein the control node device comprises control means that issues loopback instructions or loopback release instructions to an arbitrary node device, and each of said plurality of node devices comprises control means which loopbacks the first communication path to the second communication path on both left and right sides of the ring circuits as seen from the devices themselves simultaneously based on the loopback instructions and which releases the loopback based on the loopback release instructions.

2. The communication network system according to claim 1, further comprising a terminal management device that is connected to the control node device, wherein the terminal management device comprises instruction means that instructs a loopback request or loopback release request together with the name of a request target node device to the control node device, and the control node device issues a loopback instruction or loopback release instruction to applicable node devices within the ring circuits based on the instructions from the terminal management device.

3. The communication network system according to claim 2, wherein, when a node device is expanded in the ring circuits, the terminal management device executes:

a first expansion procedure that carries out the loopback request for one of two node devices adjacent to an expansion location that should undergo loopback control, a second expansion procedure that carries out the loopback request for another of said two node devices that should undergo loopback control, a third expansion procedure that carries out the loopback release request for a node device that previously received the loopback request and should undergo loopback release after the expansion operation of the node device to be expanded completes, and a fourth expansion procedure that carries out the loopback release request for a node device that subsequently received the loopback request and should undergo loopback release.

4. The communication network system according to claim 2, wherein, when a node device is reduced from the ring circuits, the terminal management device executes:

a first reduction procedure that carries out the loopback request for one of two node devices adjacent to a reduction location that should undergo loopback control, a second reduction procedure that carries out the loopback request for another of said two node devices that should undergo loopback control, a third reduction procedure that carries out the loopback release request for a node device that previously received the loopback request and should undergo loopback release after the reduction operation of the node device to be reduced completes, and a fourth reduction procedure that carries out the loopback release request for a node device that subsequently received the loopback request and should undergo loopback release.

5. The communication network system according to claim 2, wherein, when a fault occurs in a node device within the ring circuits, the terminal management device executes:

a first fault restoration procedure that carries out the loopback request for one of two node devices adjacent to the location where the fault occurred that should undergo loopback control, a second fault restoration procedure that carries out the loopback request for another of said two node devices that should undergo loopback control, a third fault restoration procedure that carries out the loopback release request for a node device that previously received the loopback request and should undergo loopback release after the fault recovering operation of the node device completes where the fault occurred, and a fourth fault restoration procedure that carries out the loopback release request for a node device that subsequently received the loopback request and should undergo loopback release.

6. The communication network system according to claim 1, wherein the ring circuits comprise an asynchronous transfer mode circuit that can set virtual paths and virtual channels, and the node devices comprise an ATM switching device that switches and outputs an ATM cell that is input from the transmission path to an input port to the ring circuits through an output port in accordance with a virtual path identifier and a virtual channel identifier contained within the ATM cell.

7. The communication network system according to claim 1, wherein the ring circuits are formed by a wire circuit.

8. The communication network system according to claim 1, wherein the ring circuits include at least one radio circuit.

9. A loopback control method for a communication network system in which a plurality of node devices and a control node device that controls this plurality of node devices are connected in a ring shape by means of ring circuits that can set a first communication path and a second communication path in a direction opposite to that of the first communication path, and during normal operation transmission of data is carried out through the first communication path between each of the node devices or between communication terminals connected to each of the node devices, the loopback control method carrying out loopback and loopback release between the first communication path and the second communication path, wherein loopback instructions or loopback release instructions are issued to any of the node devices from the control node device, and each of the node devices loopbacks the first communication path to the second communication path on both left and right sides of the ring circuits as seen from the devices themselves simultaneously based on the loopback instructions and releases the loopback based on the loopback release instructions.

10. The loopback control method according to claim 9, wherein the communication network system further comprises a terminal management device that is connected to the control node device, wherein the terminal management device instructs a loopback request or loopback release request together with name of a request target node device to the control node device, and the control node device issues a loopback instruction or loopback release instruction to applicable node devices within the ring circuits based on the instructions from the terminal management device.

11. The loopback control method according to claim 10, wherein the terminal management device executes, when at least one of said node devices is expanded within the ring circuits:

a first expansion procedure that carries out the loopback request for one of two node devices adjacent to an expansion location that should undergo loopback control, a second expansion procedure that carries out the loopback request for another of said two node devices that should undergo loopback control, a third expansion procedure that carries out the loopback release request for a node device that previously received the loopback request and should undergo loopback release after the expansion operation of the node device to be extended completes, and a fourth expansion procedure that carries out the loopback release request for a node device that subsequently received the loopback request and should undergo loopback release.

12. The loopback control method according to claim 10, wherein the terminal management device executes, when a node is reduced within the ring circuits:

a first reduction procedure that carries out the loopback request for one of two node devices adjacent to a reduction location that should undergo loopback control, a second reduction procedure that carries out the loopback request for another of said two node devices that should undergo loopback control, a third reduction procedure that carries out the loopback release request for a node device that previously received the loopback request and should undergo loopback release after the reduction operation of the node device to be reduced completes, and a fourth reduction procedure that carries out the loopback release request for a node device that subsequently received the loopback request and should undergo loopback release.

13. The loopback control method according to claim 10, wherein the terminal management device executes the following procedures when a fault occurs in node devices within the ring circuits:

a first fault restoration procedure that carries out the loopback request for one of two node devices adjacent to a location where the fault occurred that should undergo loopback control, a second fault restoration procedure that carries out the loopback request for another of said two node devices that should undergo loopback control, a third fault restoration procedure that carries out the loopback release request for a node device that previously received the loopback request and should undergo loopback release after the fault recovering operation of the node device completes where the fault occurred, and a fourth fault restoration procedure that carries out the loopback release request for a node device that subsequently received the loopback request and should undergo loopback release.

14. The loopback control method according to claim 9, wherein the ring circuits comprise an asynchronous transfer mode circuit that can set virtual paths and virtual channels, and the node devices comprise an ATM switching device that switches and outputs an ATM cell that is input from the ring circuits to an input port to the ring circuits through an output port in accordance with a virtual path identifier and a virtual channel identifier contained within the ATM cell.

15. A communication network system, comprising:

a plurality of ring systems each comprising a plurality of node devices connected by a ring-shaped ring circuit with communication being carried out between the node devices or between communication terminals connected to each of the node devices through the ring circuit; and a common node device arranged as a single node device common to each of the ring systems that accommodates the ring circuits of each of the ring systems and a relay circuit, the ring circuits and relay circuit being formed by virtual paths (VP) and virtual channels (VC) that are settable therein, wherein the common node device includes switching means that implements VP switching path settings for enabling switching and connecting all the VCs of the ring circuits of the ring systems to the VP of the relay circuit by means of the VPs of the ring circuits, wherein the VP switching path settings by the switching means forms, between the ring circuits of each of the ring circuits and the relay circuit, a first VP that unilaterally transmits communication data of the communication terminals arranged in each of the ring circuits, and a second VP having a direction reverse to that of the first VP in the ring circuits of each of the ring systems, whereby in a normal operation communication data on each of the ring circuits is relayed to the relay circuit via the VC in the first VP, wherein the common node device comprises control means that carries out a control to set a virtual control path to each of the node devices of each of the ring systems, and a control to issue a loopback control command or a loopback release control command through the virtual control path to each of the node devices of the ring system, and wherein each of the node devices comprises control means that loopbacks the first VP to the second VP on both left and right sides of the ring circuits as seen from the devices themselves simultaneously based on the loopback instructions and that releases the loopback based on loopback release instructions.

16. The communication network system according to claim 15, wherein the relay circuit comprises a first relay circuit and a second relay circuit that are adapted to perform relay transmission to each of the ring systems, wherein the common node device comprises:

a first common node device arranged as a single node device common to each of the ring systems that accommodates the ring circuits of each of the ring systems and a first relay circuit, and relays communication data in each of the ring circuits to the first relay circuit, and a second common node device arranged separate from the first common node device as a single node device common to each of the ring systems that accommodates the ring circuits of each of the ring systems and a second relay circuit, wherein the second common node device relays communication data in each of the ring circuits to the second relay circuit, whereby the relay of communication data in each of the ring circuits is carried out using either the first relay circuit or second relay circuit by operating either the first common node device or second common node device as an active system and operating the other as a standby system.

17. The communication network system according to claim 15, wherein the ring circuits and the relay circuit are formed by an asynchronous transfer mode circuit and each of the node devices comprises an ATM switching device that switches and outputs an ATM cell that is input from the reign circuit to an input port to the ring circuit through an output port in accordance with a virtual path identifier and a virtual channel identifier contained within the ATM cell.

18. The communication network system according to claim 15, wherein the ring circuits are formed by a wire circuit.

\* \* \* \* \*